US008605370B2

(12) United States Patent
Tanaka et al.

(10) Patent No.: US 8,605,370 B2
(45) **Date of Patent: *Dec. 10, 2013**

(54) IMAGING LENS, OPTICAL APPARATUS EQUIPPED THEREWITH, AND METHOD FOR MANUFACTURING IMAGING LENS

(75) Inventors: Issei Tanaka, Yokohama (JP); Makoto Fujimoto, Tokyo (JP)

(73) Assignee: Nikon Corporation, Tokyo (JP)

(*) Notice: Subject to any disclaimer, the term of this patent is extended or adjusted under 35 U.S.C. 154(b) by 144 days.

This patent is subject to a terminal disclaimer.

(21) Appl. No.: 13/022,818

(22) Filed: Feb. 8, 2011

(65) Prior Publication Data

US 2012/0026589 A1 Feb. 2, 2012

(30) Foreign Application Priority Data

Mar. 15, 2010 (JP) ................................ 2010-057936
Feb. 4, 2011 (JP) ................................ 2011-022295

(51) Int. Cl.
*G02B 9/60* (2006.01)

(52) U.S. Cl.
USPC ........................................................ 359/770

(58) Field of Classification Search
USPC .......... 359/676, 679, 581, 770, 781, 782, 763
See application file for complete search history.

(56) References Cited

U.S. PATENT DOCUMENTS

| | | | | |
|---|---|---|---|---|
| 5,579,171 | A * | 11/1996 | Suzuki et al. | 359/687 |
| 5,774,267 | A | 6/1998 | Kodama et al. | |
| 5,847,875 | A * | 12/1998 | Kodama et al. | 359/557 |
| 6,285,502 | B1 * | 9/2001 | Konno et al. | 359/557 |
| 6,320,698 | B1 | 11/2001 | Suzuki | |
| 6,618,198 | B1 * | 9/2003 | Endo | 359/557 |
| 7,336,421 | B2 * | 2/2008 | Tanaka | 359/581 |
| 8,199,411 | B2 * | 6/2012 | Fujimoto | 359/680 |
| 2006/0203356 | A1 * | 9/2006 | Fujimoto et al. | 359/685 |
| 2009/0161219 | A1 * | 6/2009 | Ishizawa et al. | 359/586 |
| 2009/0290219 | A1 * | 11/2009 | Terayama | 359/586 |
| 2010/0238560 | A1 | 9/2010 | Fujimoto | |

FOREIGN PATENT DOCUMENTS

| | | | |
|---|---|---|---|
| JP | 07-152002 | A | 6/1995 |
| JP | 09-113808 | A | 5/1997 |
| JP | 09-230242 | A | 9/1997 |
| JP | 11-174329 | A | 7/1999 |
| JP | 11-231220 | A | 8/1999 |
| JP | 2000-356704 | A | 12/2000 |
| JP | 2004-061910 | A | 2/2004 |

OTHER PUBLICATIONS

U.S. Appl. No. 13/237,911, filed Sep. 20, 2011, Fugimoto et al.

* cited by examiner

*Primary Examiner* — Alessandro Amari
*Assistant Examiner* — Jie Lei
(74) *Attorney, Agent, or Firm* — Miles & Stockbridge P.C.

(57) ABSTRACT

An imaging lens, an optical apparatus equipped therewith, and a method for manufacturing the imaging lens are disclosed. An imaging lens consists of, in order from an object, a front group having negative power, and a rear group including a sub-lens group having negative power. At least a portion of the sub-lens group is movable in a direction including a component substantially perpendicular to an optical axis. The sub-lens group includes, in order from the object, a first negative component having negative power, a second negative component having negative power and a positive component having positive power. The shape of an air lens formed by the first negative component and the second negative component is a double convex shape. An antireflection coating is applied on at least one optical surface of the front group, and the antireflection coating including at least one layer formed by use of a wet process.

19 Claims, 26 Drawing Sheets

FIG. 2A
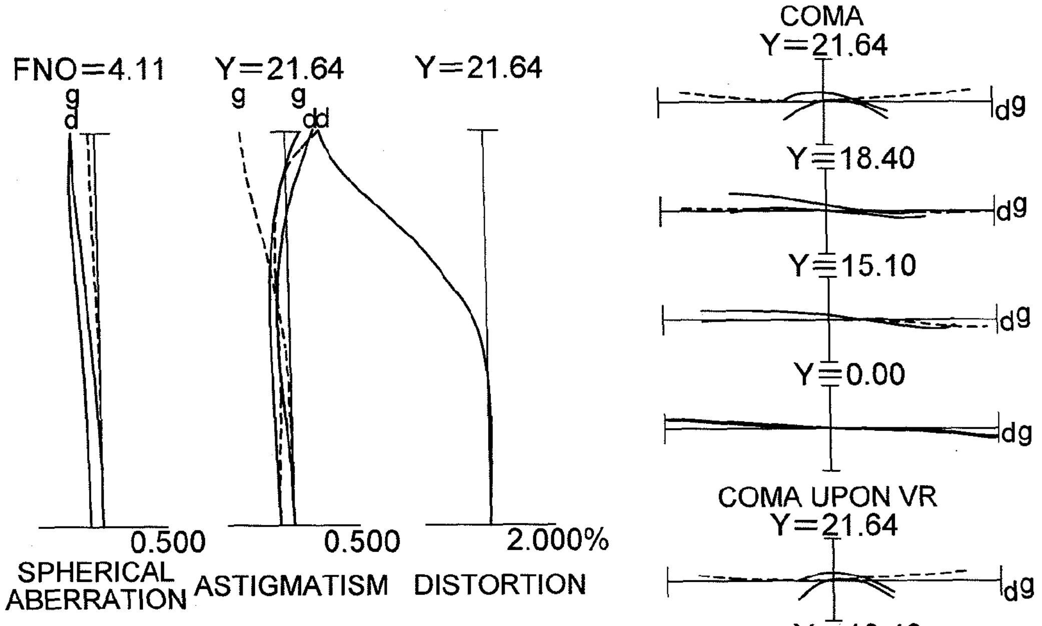
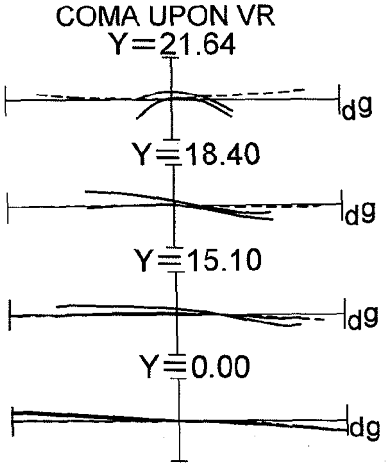
FIG. 2B

FIG. 9A
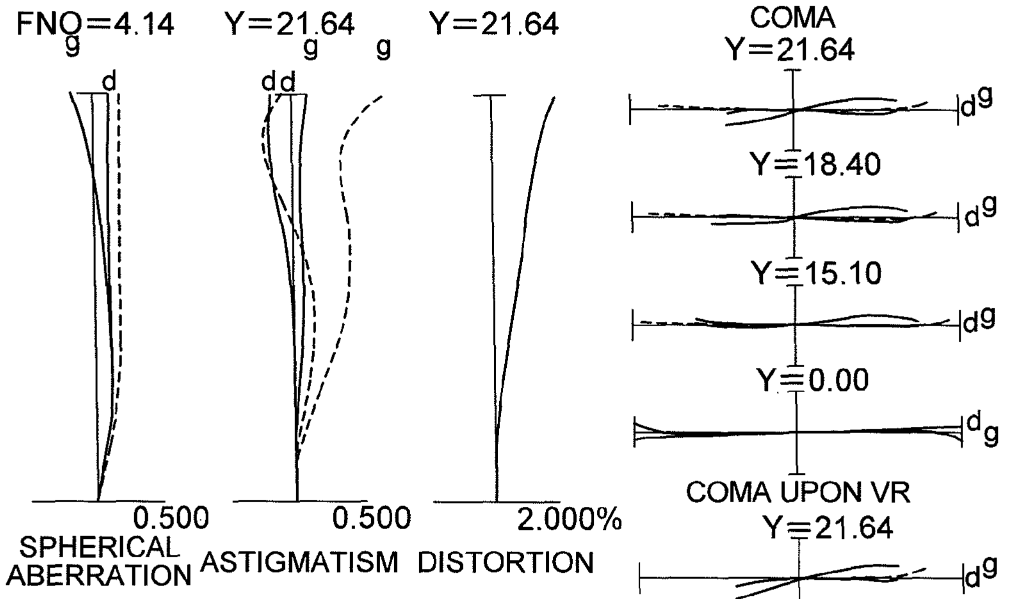
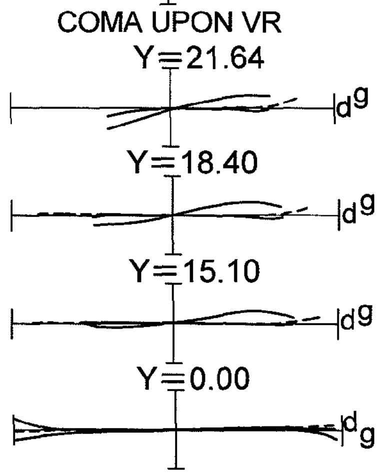
FIG. 9B

FIG. 11A
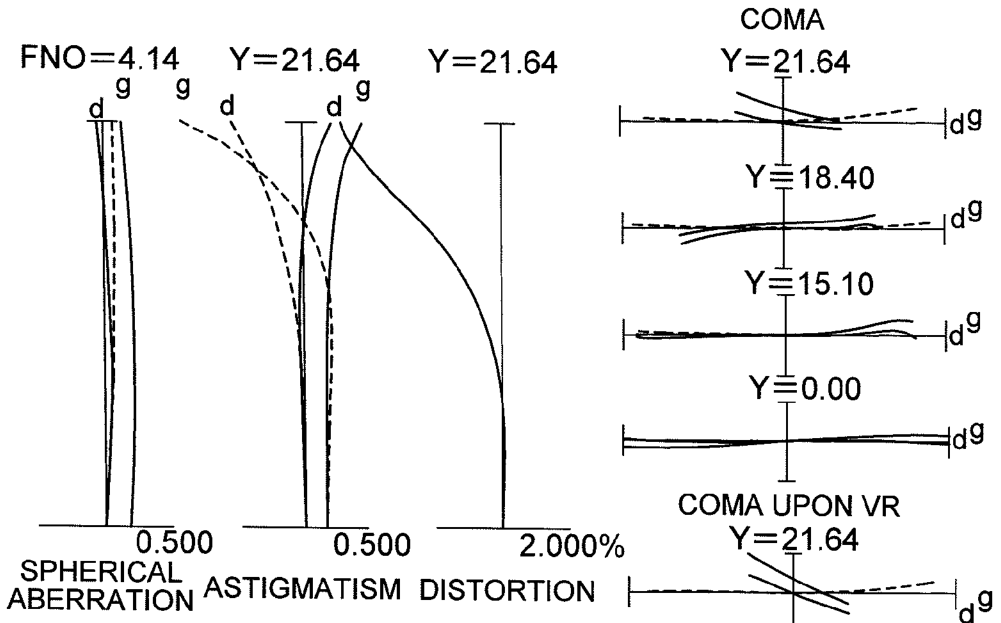
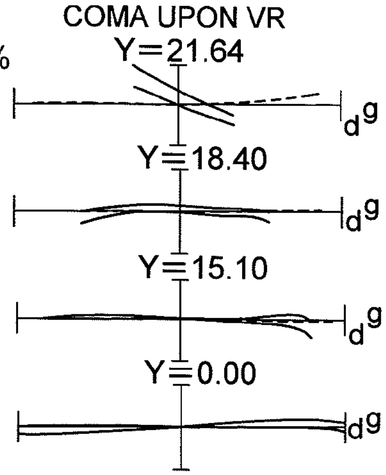
FIG. 11B

FIG. 13A
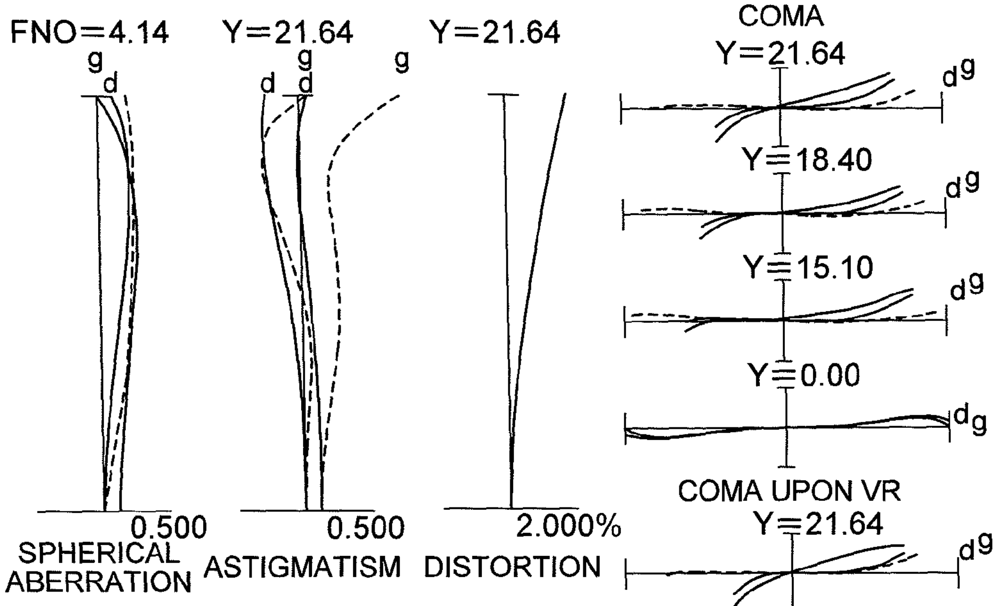
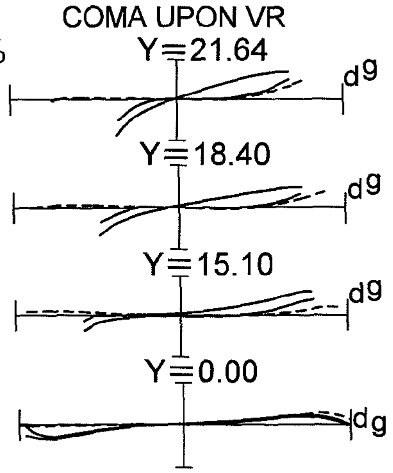
FIG. 13B

FIG. 16A
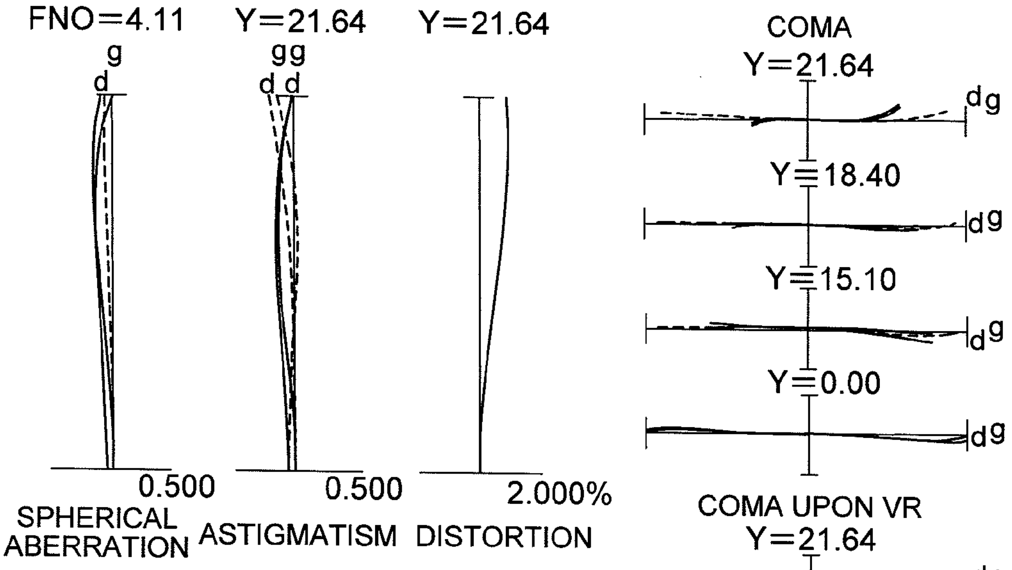
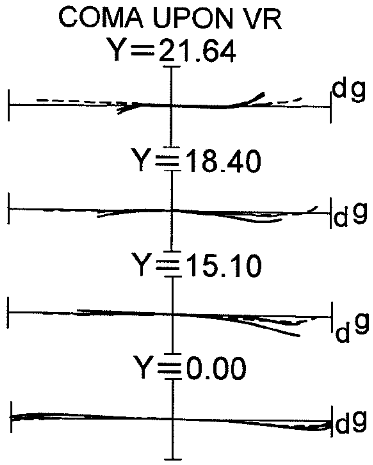
FIG. 16B

FIG. 20A
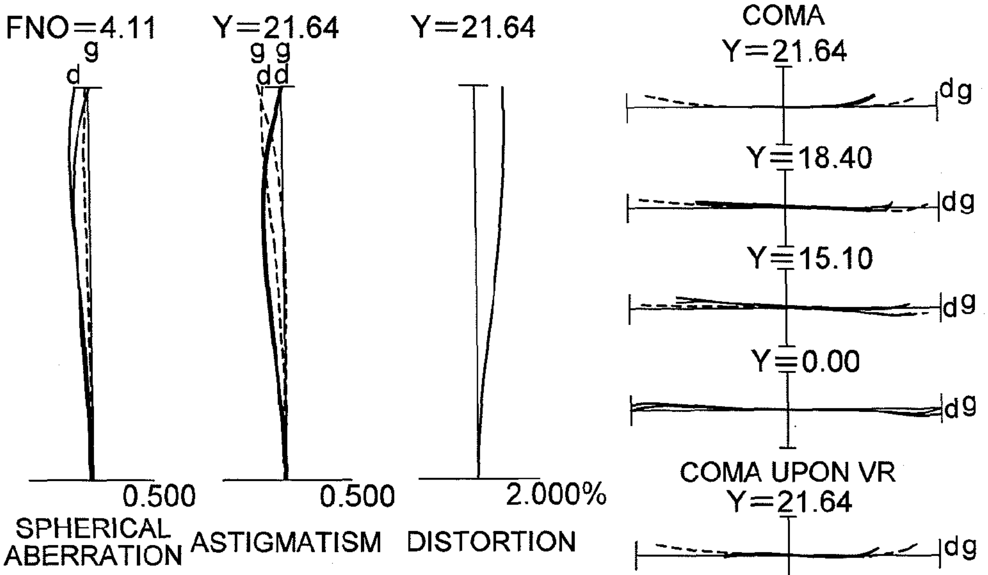
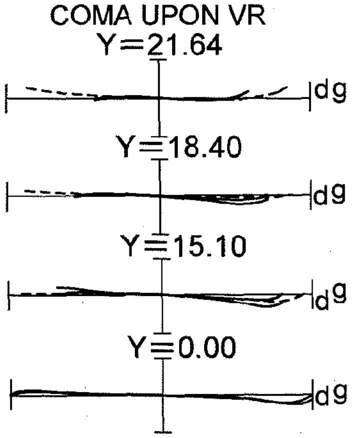
FIG. 20B

FIG. 21A
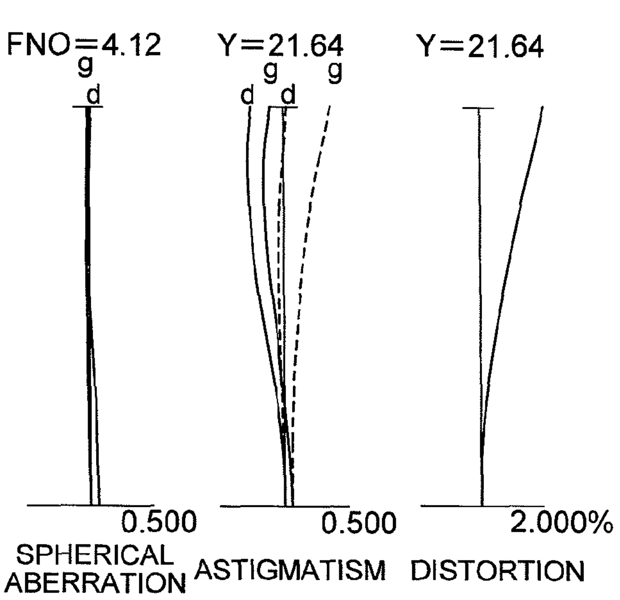
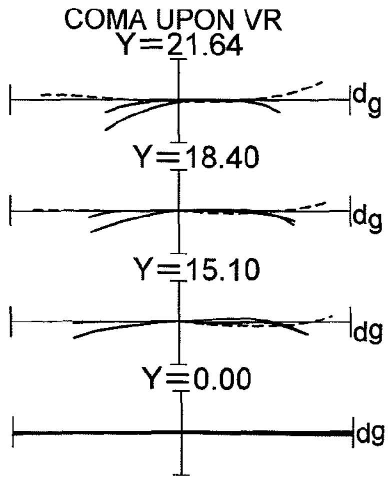
FIG. 21B

IMAGING LENS, OPTICAL APPARATUS EQUIPPED THEREWITH, AND METHOD FOR MANUFACTURING IMAGING LENS

The disclosure of the following priority applications are herein incorporated by reference:

Japanese Patent Application No. 2010-057936 filed on Mar. 15, 2010, and

Japanese Patent Application No. 2011-022295 filed on Feb. 4, 2011.

BACKGROUND ART

1. Field of the Invention

The present invention relates to an imaging lens, an optical apparatus equipped with the imaging lens and a method for manufacturing the imaging lens.

2. Related Background Art

A zoom lens having a first lens group with negative refractive power suitable for wide-angle photography and having a vibration reduction function has been proposed, for example, Japanese Patent Application Laid-Open No. 7-152002.

With making a third lens group having negative refractive power as a vibration reduction lens group, the zoom lens has excellent vibration reduction performance. Moreover, in recent years, increased strictness about ghost images and flare defined as one of factors, which affect not only aberration correction performance but also optical performance, has been requested to such a zoom lens. Therefore, a request for the higher performance is given also to an antireflection coating formed on a lens surface, and a multi-layered film design technique and a multi-layered film forming technique continue their developments (refer to, e.g., Japanese Patent Application Laid-Open No. 2000-356704).

However, in such a zoom lens having the first lens group with negative refractive power, there has been a problem that a zoom lens making the third lens group with negative refractive power as a vibration reduction lens group is difficult to keep high optical performance in comparison with a conventional zoom lens. Moreover, there has been a problem that optical surfaces of such a zoom lens tend to generate reflection light producing ghost images and flare.

SUMMARY OF THE INVENTION

The present invention is made in view of the above-described problems, and has an object to provide an imaging lens having high optical performance with excellently correcting variation in aberrations upon shifting a lens group for vibration reduction and reducing ghost images and flare, an optical apparatus equipped with the imaging lens and a method for manufacturing the imaging lens.

In order to solve the problem, the present invention provides an imaging lens consisting of: a front lens group having negative refractive power disposed to the most object side; and a rear lens group disposed to an image side of the front lens group, the rear lens group including a sub-lens group having negative refractive power, at least a portion of the sub-lens group moving in a direction including a component substantially perpendicular to an optical axis, the sub-lens group including, in order from the object side, a first negative lens component having negative refractive power, a second negative lens component having negative refractive power, and a positive lens component having positive refractive power, the second negative lens component side lens surface of the first negative lens component being a concave surface facing the second negative lens component, the second negative lens component having a meniscus shape whose concave surface facing the first negative lens component side, an antireflection coating being applied on at least one optical surface of the front lens group, and the antireflection coating including at least one layer formed by use of a wet process.

Moreover, the present invention provides an optical apparatus equipped with the imaging lens described above that forms an image of an object on a given image plane.

Furthermore, the present invention provides a method for manufacturing an imaging lens according to the present invention, the method comprising steps of: disposing, in order from an object side, a front lens group having negative refractive power, and a rear lens group including a sub-lens group having negative refractive power; applying an antireflection coating to at least one optical surface in the first lens group such that the antireflection coating includes at least one layer formed by a wet process; disposing the sub-lens group, in order from the object side, a first negative lens component having negative refractive power, a second negative lens component having negative refractive power and a positive lens component having positive refractive power; disposing an air lens formed between the first negative lens component and the second negative lens component having a double convex shape; and disposing at least a portion of the sub-lens group movable in a direction including a component substantially perpendicular to an optical axis.

The present invention makes it possible to provides an imaging lens having high optical performance with excellently correcting variation in aberrations upon shifting a lens group for vibration reduction and reducing ghost images and flare, an optical apparatus equipped with the imaging lens and a method for manufacturing the imaging lens.

BRIEF DESCRIPTION OF THE DRAWINGS

FIGS. 2A and 2B are graphs of various aberrations of the imaging lens according to Example 1 in the wide-angle end state upon focusing on infinity, in which FIG. 2A shows various aberrations without vibration reduction, and FIG. 2B shows coma upon vibration reduction.

FIGS. 3A and 3B are graphs of various aberrations of the imaging lens according to Example 1 in an intermediate focal length state upon focusing on infinity, in which FIG. 3A shows various aberrations without vibration reduction, and FIG. 3B shows coma upon vibration reduction.

FIGS. 4A and 4B are graphs of various aberrations of the imaging lens according to Example 1 in a telephoto end state upon focusing on infinity, in which FIG. 4A shows various aberrations without vibration reduction, and FIG. 4B shows coma upon vibration reduction.

FIGS. 7A and 7B are graphs of various aberrations of the imaging lens according to Example 2 in the wide-angle end state upon focusing on infinity, in which FIG. 7A shows various aberrations without vibration reduction, and FIG. 7B shows coma upon vibration reduction.

FIGS. 8A and 8B are graphs of various aberrations of the imaging lens according to Example 2 in an intermediate focal length state upon focusing on infinity, in which FIG. 8A shows various aberrations without vibration reduction, and FIG. 8B shows coma upon vibration reduction.

FIGS. 9A and 9B are graphs of various aberrations of the imaging lens according to Example 2 in a telephoto end state upon focusing on infinity, in which FIG. 9A shows various aberrations without vibration reduction, and FIG. 9B shows coma upon vibration reduction.

FIGS. 11A and 11B are graphs of various aberrations of the imaging lens according to Example 3 in the wide-angle end state upon focusing on infinity, in which FIG. 11A shows various aberrations without vibration reduction, and FIG. 11B shows coma upon vibration reduction.

FIGS. 12A and 12B are graphs of various aberrations of the imaging lens according to Example 3 in an intermediate focal length state upon focusing on infinity, in which FIG. 12A shows various aberrations without vibration reduction, and FIG. 12B shows coma upon vibration reduction.

FIGS. 13A and 13B are graphs of various aberrations of the imaging lens according to Example 3 in a telephoto end state upon focusing on infinity, in which FIG. 13A shows various aberrations without vibration reduction, and FIG. 13B shows coma upon vibration reduction.

FIGS. 15A and 15B are graphs of various aberrations of the imaging lens according to Example 4 in the wide-angle end state upon focusing on infinity, in which FIG. 15A shows various aberrations without vibration reduction, and FIG. 15B shows coma upon vibration reduction.

FIGS. 16A and 16B are graphs of various aberrations of the imaging lens according to Example 4 in an intermediate focal length state upon focusing on infinity, in which FIG. 16A shows various aberrations without vibration reduction, and FIG. 16B shows coma upon vibration reduction.

FIGS. 17A and 17B are graphs of various aberrations of the imaging lens according to Example 4 in a telephoto end state upon focusing on infinity, in which FIG. 17A shows various aberrations without vibration reduction, and FIG. 17B shows coma upon vibration reduction.

FIGS. 19A and 19B are graphs of various aberrations of the imaging lens according to Example 5 in the wide-angle end state upon focusing on infinity, in which FIG. 19A shows various aberrations without vibration reduction, and FIG. 19B shows coma upon vibration reduction.

FIGS. 20A and 20B are graphs of various aberrations of the imaging lens according to Example 5 in an intermediate focal length state upon focusing on infinity, in which FIG. 20A shows various aberrations without vibration reduction, and FIG. 20B shows coma upon vibration reduction.

FIGS. 21A and 21B are graphs of various aberrations of the imaging lens according to Example 5 in a telephoto end state upon focusing on infinity, in which FIG. 21A shows various aberrations without vibration reduction, and FIG. 21B shows coma upon vibration reduction.

DESCRIPTION OF THE EMBODIMENTS

Figure 1:
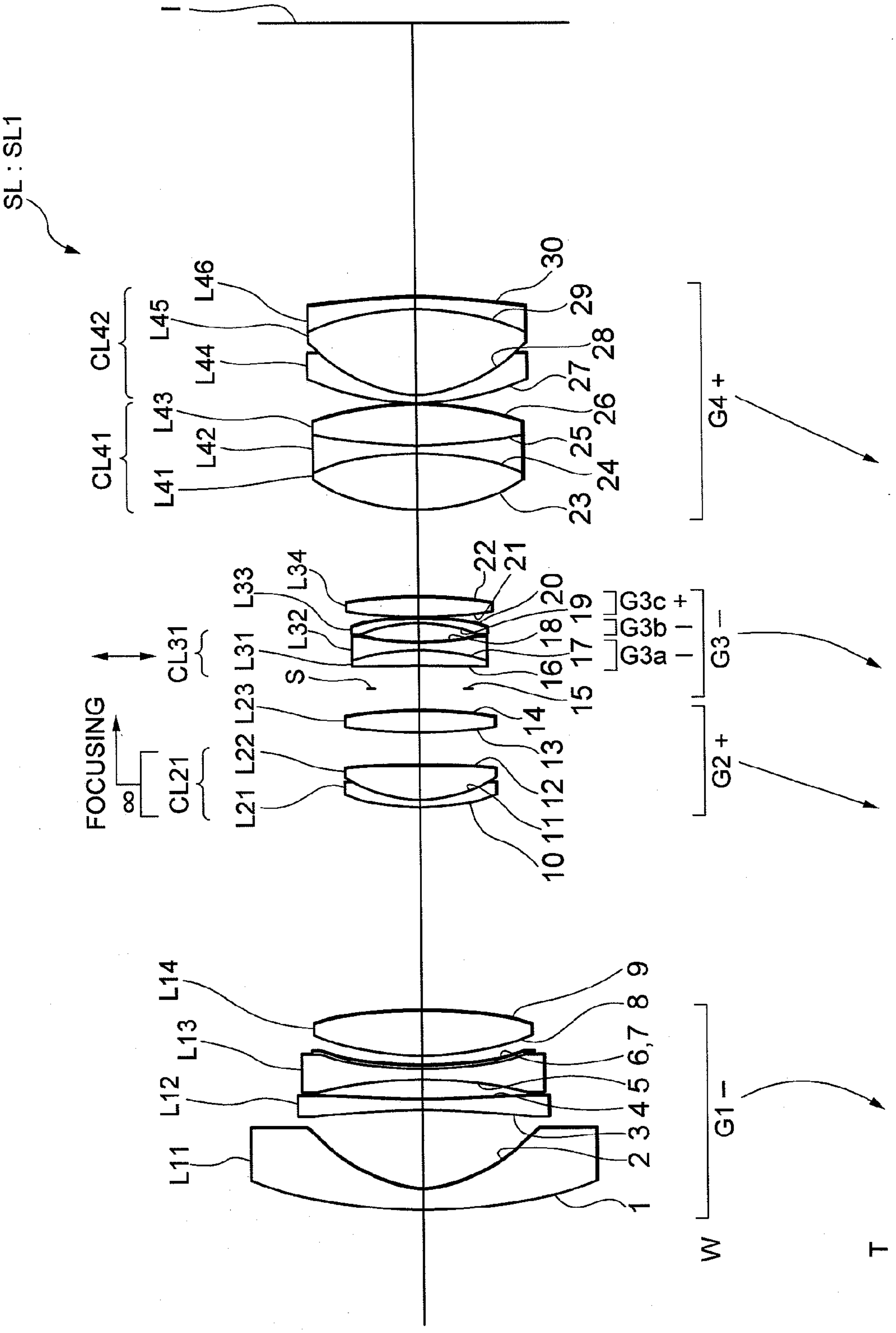
FIG. 1 is a sectional view showing a configuration of an imaging lens according to Example 1 in a wide-angle end state and a zoom trajectory of each lens group upon zooming.
Figure 3A:
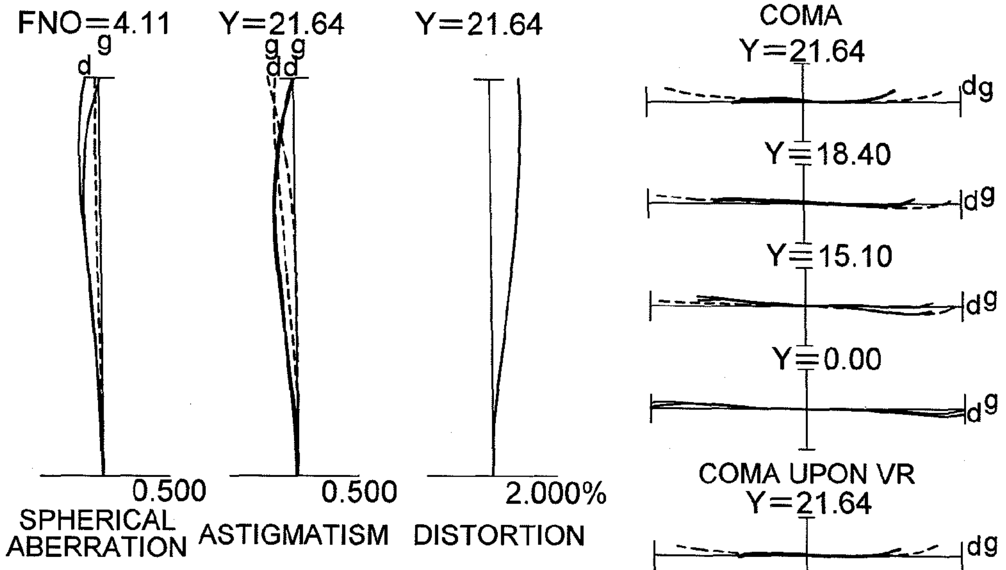
Figure 3B:
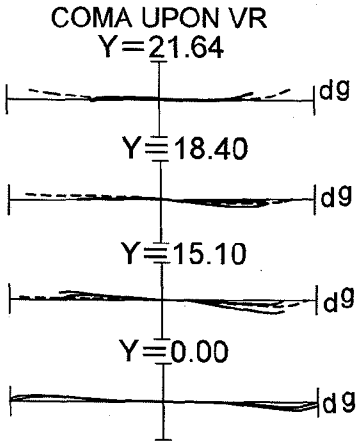

An imaging lens according to an embodiment of the present invention will be described below. It should be noted that the following embodiment is no more than facilitating the comprehension of the invention but is not intended to exclude implementation of practicable addition, replacement, etc by those skilled in the art within a range that does not deviate from the technical idea of the invention of the present application.

An imaging lens according to the present embodiment consists of a front lens group having negative refractive power disposed to the most object side and a rear lens group disposed to an image side of the front lens group. The rear lens group includes a sub-lens group having negative refractive power. At least a portion of the sub-lens group moves in a direction including a component substantially perpendicular to an optical axis. The sub-lens group includes, in order from the object side, a first negative lens component having negative refractive power, a second negative lens component having negative refractive power, and a positive lens component having positive refractive power. The most-second-negative-lens-component-side lens surface of the first negative lens component is a concave surface facing the second negative lens component side. The second negative lens component has a meniscus shape having a concave surface facing the first negative lens component side. At least one optical surface of the front lens group is applied with an antireflection coating, and the antireflection coating includes at least one layer that is formed by a wet process.

With this configuration, an imaging lens according to the present embodiment makes it possible to obtain high optical performance with excellently correcting variation in aberrations upon shifting a lens group for vibration reduction and reducing ghost images and flare.

In an imaging lens according to the present embodiment, at least a portion or the whole of the sub-lens group in the rear lens group is made to be a shift lens group, which is also called as a vibration reduction lens group, and moved in a direction including a component substantially perpendicular to the optical axis.

Moreover, the sub-lens group includes, in order from the object side, the first negative lens component having negative refractive power, the second negative lens component having negative refractive power, and the positive lens component having positive refractive power. The second-negative-lens-component-side lens surface of the first negative lens component is a concave surface facing the second negative lens component side. The second negative lens component has a meniscus shape having a concave surface facing the first negative lens component side. In this manner, the shape of an air lens formed by the first negative lens component and the second negative lens component is a double convex shape. With this configuration, it becomes possible to prevent a lens group disposed to the image side of the sub-lens group from getting larger.

When at least one of the first negative lens component, the second negative lens component and the positive lens component is made to be the vibration reduction lens group, it becomes possible to minimize decentering coma and partial blurring (asymmetric sharpness) in the meridional image plane and the sagittal image plane generated upon shifting the vibration reduction lens group in a direction including a component substantially perpendicular to the optical axis, which is also called as a vibration reduction correction. Incidentally, the vibration reduction lens group may be composed of the first negative lens component and the second negative lens component, and the position of the positive lens component may be fixed in the direction including a component substantially perpendicular to the optical axis upon vibration reduction.

With giving positive refractive power to the positive lens component, the positive lens component in the sub-lens group has an effect of downsizing the diameter of the lens group disposed to the image side of the sub-lens group.

Generally, in a negative-leading zoom lens whose front lens group has negative refractive power, the front lens group is the largest lens group, and the front lens group may be moved to the object side upon focusing. Accordingly, when the front lens group is made to be the vibration reduction lens group, a holding mechanism and a driving mechanism become large and complicated, so that it is undesirable.

Moreover, when a lens group, other than the front lens group and the sub-lens group, having a large moving amount along the optical axis upon zooming is made to be the vibration reduction lens group, a holding mechanism and a driving mechanism become large and complicated, so that it is undesirable. In particular, a lens group having positive refractive power disposed between the front lens group and the sub-lens group tends to generate decentering aberration. Accordingly, when a portion or the whole of the lens group is made to be the vibration reduction lens group, it becomes difficult to realize high vibration reduction performance, so that it is undesirable.

The lens diameter of the sub-lens group can be made relatively small, and a moving amount along the optical axis of the sub-lens group upon zooming can be small with respect to that of any other lens group. Moreover, the sub-lens group may be fixed upon zooming. Since the sub-lens group generates smallest amount of decentering aberration among lens groups in the imaging lens, the sub-lens group is suitable for the vibration reduction lens group.

In an imaging lens according to the present embodiment, an antireflection coating is applied to at least one optical surface among the optical surfaces in the front lens group having negative refractive power, and the antireflection coating includes at least one layer that is formed by a wet process. With this configuration, an imaging lens according to the present embodiment makes it possible to realize high optical performance with reducing ghost images and flare generated by reflection from the optical surface.

In an imaging lens according to the present embodiment, the antireflection coating applied on the optical surface in the front lens group is a multi-layered film, and the layer formed by the wet process is preferably the uppermost layer among the layers composing the multi-layered film. With this configuration, since difference in refractive index with respect to the air can be small, reflection of light can be small, so that ghost images and flare can further be suppressed.

In an imaging lens according to the present embodiment, a refractive index of the layer formed by the wet process is preferably 1.30 or less. With this configuration, since difference in refractive index with respect to the air can be small, reflection of light can be small, so that ghost images and flare can further be suppressed.

In an imaging lens according to the present embodiment, the antireflection coating preferably includes at least one layer with a refractive index at d-line of 1.30 or less that is formed by not only a wet process but a dry process, and the like. With forming such an antireflection coating by the dry process, the same effect with using the wet process can be obtained. In this case, the layer having the refractive index of 1.30 or less is preferably the uppermost layer among the layers composing the multi-layered film.

In an imaging lens according to the present embodiment, an optical surface on which the antireflection coating is applied is preferably a concave surface. Since ghost images tend to be generated on a lens surface having concave shape, with applying the antireflection coating to the optical surface, ghost images and flare can be effectively suppressed.

In an imaging lens according to the present embodiment, the concave surface on which the antireflection coating is applied is preferably an image side lens surface. Since ghost images tend to be generated on the concave surface facing the image side in the front lens group, with applying the antireflection coating to this optical surface, ghost images and flare can be effectively suppressed.

In an imaging lens according to the present embodiment, the convex (sic) surface on which the antireflection coating is applied is preferably an object side lens surface. Since ghost images tend to be generated on the concave surface facing the object side, with applying the antireflection coating to this optical surface, ghost images and flare can be effectively suppressed.

In an imaging lens according to the present embodiment, an optical surface on which the antireflection coating is applied is preferably a convex surface. Since ghost images tend to be generated on a lens surface having convex shape, with applying the antireflection coating to this optical surface, ghost images and flare can be effectively suppressed.

In an imaging lens according to the present embodiment, an optical surface on which the antireflection coating is applied is preferably a lens surface of the most object side lens. Since ghost images tend to be generated on a lens surface having convex shape, with applying the antireflection coating to this optical surface, ghost images and flare can be effectively suppressed.

In an imaging lens according to the present embodiment, an optical surface on which the antireflection coating is applied is preferably a lens surface of a second lens counted from the most object side. Since ghost images tend to be generated on a lens surface having concave shape facing the object side, with applying the antireflection coating to this optical surface, ghost images and flare can be effectively suppressed.

In an imaging lens according to the present embodiment, an aperture stop is preferably disposed in the vicinity of the sub-lens group. With this configuration, it becomes possible to prevent a lens group disposed to the image side of the sub-lens group from getting larger. Moreover, when at least a portion of the sub-lens group is made to be a vibration reduction lens group, it becomes possible to minimize decentering coma and partial blurring (asymmetric sharpness) in the meridional image plane and the sagittal image plane generated upon shifting the vibration reduction lens group in a direction including a component substantially perpendicular to the optical axis.

In an imaging lens according to the present embodiment, an aperture stop is preferably disposed in the vicinity of the object side of the first negative lens component in the sub-lens group. With disposing the aperture stop in the vicinity of the first negative lens component, it becomes possible to minimize decentering coma and partial blurring (asymmetric sharpness) in the meridional image plane and the sagittal image plane generated upon shifting the vibration reduction lens group in a direction including a component substantially perpendicular to the optical axis.

Moreover, the positive lens component in the sub-lens group is preferably a single lens having a double convex shape. With this configuration, it becomes possible to prevent a lens group disposed to the image side of the sub-lens group including the positive lens component from getting larger. Moreover, it becomes possible to minimize decentering coma and partial blurring in the meridional image plane and the sagittal image plane generated upon shifting the vibration reduction lens group in a direction including a component substantially perpendicular to the optical axis.

When each of the first negative lens component, the second negative lens component and the positive lens component is constructed by a single lens, chromatic difference in curvature of field in the telephoto end state tends to be generated. When glass materials having low dispersion are chosen as lens mediums, curvature of field can be suppressed to a certain extent. However, the refractive index of glass material decreases resulting in trade-off relation with decentering coma.

Accordingly, in an imaging lens according to the present embodiment, at least one of the first negative lens component, the second negative lens component and the positive lens component is preferably a cemented lens constructed by a negative lens cemented with a positive lens. With this configuration, it becomes possible to excellently correct chromatic difference in curvature of field in the telephoto end state. Although two or more of these lens components may be cemented lenses, for the purpose of saving weight, each lens component other than the cemented lens is preferably a single lens.

In an imaging lens according to the present embodiment, when at least one lens component is made to be a cemented lens, the cemented surface of the cemented lens is preferably a concave surface facing the aperture stop. With this configuration, it becomes possible to excellently suppress generation of chromatic difference in curvature of field upon shifting the vibration reduction lens group in a direction including a component substantially perpendicular to the optical axis.

In an imaging lens according to the present embodiment, although the sub-lens group is composed of the first negative lens component, the second negative lens component and the positive lens component, another lens component may be added adjacent outside to the first negative lens component or the positive lens component.

In an imaging lens according to the present embodiment, the front lens group consists of a first lens group, and the rear lens group includes, in order from the object side, a second lens group having positive refractive power, a third lens group having negative refractive power, and a fourth lens group having positive refractive power. The sub-lens group consists of the third lens group. It is preferable that upon zooming from a wide-angle end state to a telephoto end state, each lens group moves along an optical axis such that a distance between the first lens group and the second lens group varies, a distance between the second lens group and the third lens group varies, and a distance between the third lens group and the fourth lens group varies. With this configuration, an imaging lens makes it possible to realize both of a wide angle of view and high optical performance.

In an imaging lens according to the present embodiment, it is preferable that upon zooming, the distance between the first lens group and the second lens group decreases, the distance between the second lens group and the third lens group increases, and the distance between the third lens group and the fourth lens group decreases. With this configuration, an imaging lens makes it possible to realize both of a wide angle of view and high optical performance.

In an imaging lens according to the present embodiment, the front lens group consists of a first lens group having negative refractive power, and the rear lens group includes, in order from the object side, a second lens group having positive refractive power, a third lens group having positive refractive power, a fourth lens group having negative refractive power, and a fifth lens group having positive refractive power. It is preferable that upon zooming from a wide-angle end state to a telephoto end state, each lens group moves along an optical axis such that a distance between the first lens group and the second lens group decreases, a distance between the second lens group and the third lens group varies, a distance between the third lens group and the fourth lens group increases, and a distance between the fourth lens group and the fifth lens group decreases. With this configuration, an imaging lens makes it possible to realize both of a wide angle of view and high optical performance. Moreover, a degree of freedom of optical design increases, so that higher optical performance can be obtained.

An imaging lens according to the present embodiment consists of, in order from the object side, a front lens group that is a first lens group having negative refractive power, and a rear lens group that includes a second lens group having negative refractive power, a third lens group having positive refractive power, a fourth lens group having negative refractive power, and a fifth lens group having positive refractive power. The sub-lens group may be the fourth lens group.

In an imaging lens according to the present embodiment, the following conditional expression (1) is preferably satisfied:

$$|r2|<|r1| \tag{1}$$

where r1 denotes a radius of curvature of the second-negative-lens-component side lens surface of the first negative lens component, and r2 denotes a radius of curvature of the first-negative-lens-component side lens surface of the second negative lens component.

Conditional expression (1) defines an air lens formed by the first negative lens component and the second negative lens component. In other words, in a conventional telescopic type vibration reduction lens group, the radius of curvature of the aperture stop side lens surface is smaller. However, in an imaging lens satisfying conditional expression (1), the air lens formed by the first negative lens component and the second negative lens component has larger absolute value of radius of curvature r1 of the aperture stop side lens surface. With satisfying conditional expression (1), it becomes possible to compose the vibration reduction lens group suitable for an imaging lens having a wide angle of view.

In an imaging lens according to the present embodiment, when r1 denotes a radius of curvature of the second-negative-lens-component side lens surface of the first negative lens component, and r2 denotes a radius of curvature of the firstnegative-lens-component side lens surface of the second negative lens component, the following conditional expression (2) is preferably satisfied:

$$0.0<Fa<0.5 \quad (2)$$

where Fa is a variable defined by the following expression:

$$Fa=(r1+r2)/\max(|r1|,|r2|)$$

where max( ) is a function that returns the largest value among a plurality of values.

Conditional expression (2) defines an appropriate relation between the radii of curvature r1 and r2 of the air lens formed by the first negative lens component and the second negative lens component. With satisfying conditional expression (2), the vibration reduction lens group becomes suitable for an imaging lens having a wide angle of view. Moreover, it becomes possible to minimize an inclination of the image plane generated upon shifting the vibration reduction lens group in a direction including a component substantially perpendicular to the optical axis.

In an imaging lens according to the present embodiment, the following conditional expression (3) is preferably satisfied:

$$0.5<Fb<2.0 \quad (3)$$

where Fb is defined by the following expression:

$$Fb=Fg3c/|Fg3|$$

where Fg3 denotes a focal length of the vibration reduction lens group, and Fg3*c* denotes a focal length of the positive lens component.

Conditional expression (3) defines a ratio of the focal length of the vibration reduction lens group to the focal length of the positive lens component. With satisfying conditional expression (3), the vibration reduction lens group acquires excellent vibration reduction property, and a lens group disposed to the image side of the vibration reduction lens group can be prevented from getting larger. When the value Fb is equal to or falls below the lower limit of conditional expression (3), although the diameter of the lens group disposed to the image side of the vibration reduction lens group becomes small, the focal lengths of the first negative lens component and the second negative lens component become relatively shorter, so that vibration reduction property and optical performance become worse. Accordingly, it is undesirable. On the other hand, when the value Fb is equal to or exceeds the upper limit of conditional expression (3), the diameter of the lens group disposed to the image side of the vibration reduction lens group becomes large, and the vibration reduction lens group becomes unsuitable for an imaging lens having a wide angle of view, so that it is undesirable.

Figure 22:
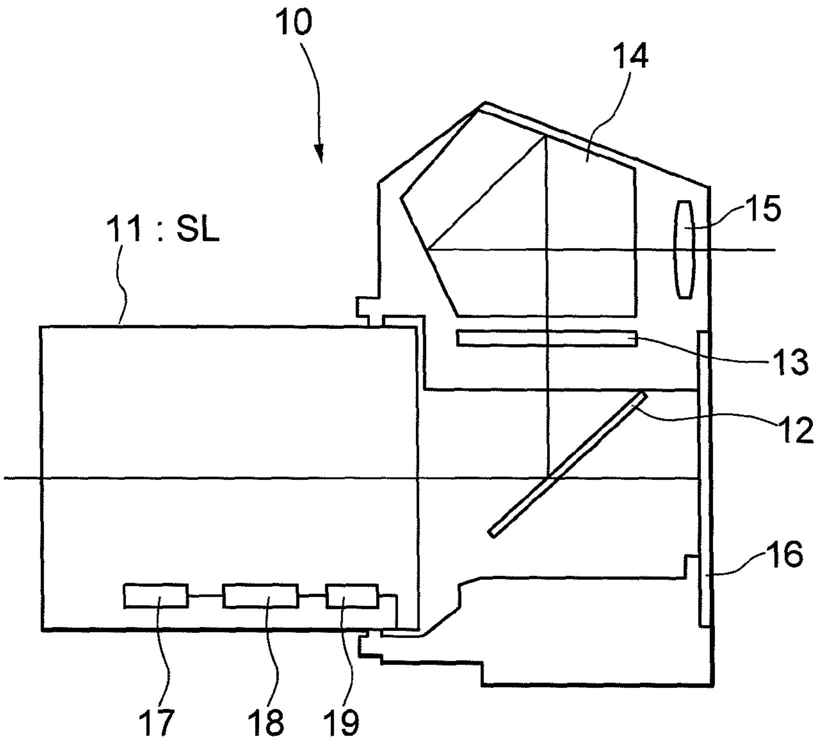
FIG. 22 is a sectional view showing a single-lens reflex digital camera equipped with the imaging lens according to the present embodiment.

FIG. 22 shows a schematic view of an optical apparatus (a single-lens reflex camera) equipped with an imaging lens according to the present embodiment.

In FIG. 22, light rays from an unillustrated object are converged by an imaging lens 11 (SL), and an image is formed on a focusing screen 13 via a quick return mirror 12. Then, the light rays, of which the image is formed on the focusing screen 13, are reflected plural times within a pentagonal roof prism 14 and led to an eyepiece 15. A photographer is thereby capable of observing the object as an erected image via the eyepiece 15.

After fixing composition of the picture of the object through the eyepiece 15 with pressing an unillustrated release button half way down, the photographer presses the release button all the way down. When the release button is pressed all the way down, the quick return mirror 3 leaps up, and the light rays from the unillustrated object form an object image on an imaging device 16. Accordingly, the light rays emitted from the object are captured by the imaging device 16, and stored in an unillustrated memory as a photographed image of the object.

When the release button is pressed all the way down, a sensor 17 (such as an angular sensor) installed in the imaging lens 11 detects an inclination of the imaging lens 11 and transmits this to a CPU 18. Then, an amount of rotational camera shake is calculated by the CPU 18, and a lens driver 19 that drives a vibration reduction lens group in a direction including a component substantially perpendicular to the optical axis is driven, thereby correcting an image blur on the imaging device 16 upon generating a camera shake. In this manner, the camera 10, which is the optical apparatus equipped with the imaging lens 11 according to the present embodiment, is constructed. Incidentally, the camera 10 shown in FIG. 22 may be a one that removably holds the imaging lens 11, or a one that integrally holds the imaging lens 11. Moreover, the camera 10 may be constructed as a so-called single lens reflex camera and may also be constructed as a mirror-less camera including none of the quick return mirror.

Incidentally, the following description may suitably be applied within limits that do not deteriorate optical performance.

In the above-described embodiment, although a lens system having a four-movable-lens-group configuration or a five-movable-lens-group configuration has been shown, a lens configuration that a lens group is added adjacent to the object side or the image side of the lens system is possible.

In the above-described embodiment, although a lens system having a four-lens-group configuration or a five-lens-group configuration has been shown, the above described lens configuration can be applied to other lens configurations such as a six-lens-group configuration. A lens configuration that a lens or a lens group is added to the most object side of the lens system or a lens configuration that a lens or a lens group is added to the most image side of the lens system is possible. Incidentally, a lens group is a lens portion constructed by at least one lens separated by air spaces that vary upon zooming. Moreover, a lens component is a single lens or a cemented lens constructed by cementing a plurality of lenses.

A portion of a lens group, a single lens group, or a plurality of lens groups may be moved along the optical axis as a focusing lens group that carries out focusing from infinity to a close object. In this case, the focusing lens group can be used for auto focus, and suitable for being driven by a motor such as an ultrasonic motor. It is particularly preferable that the whole or at least a portion of the second lens group is moved as the focusing lens group.

Moreover, any lens surface may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed in the vicinity of the third lens group or the fourth lens group, which is the sub-lens group, the function of the aperture stop may be substituted by a lens frame without disposing a member as an aperture stop.

In an imaging lens according to the present embodiment, the first lens group, which is the front lens group, preferably includes one positive lens component and two or three negative lens components. Moreover, the first lens group preferably disposes lens components, in order from the object side, negative-negative-positive or negative-negative-negative-positive with interposing air spaces between them. Otherwise, the first lens group may include a cemented lens constructed by a negative lens cemented with a positive lens.

In an imaging lens according to the present embodiment, the second lens group in the rear lens group preferably includes two positive lens components and one negative lens component. The second lens group preferably disposes lens components, in order from the object side, negative-positive-positive. Moreover, the second lens group is preferably composed of one cemented lens constructed by a negative lens cemented with a positive lens, and a single lens having positive refractive power.

In an imaging lens according to the present embodiment, the third lens group, which is the sub-lens group, preferably includes one positive lens component and two negative lens components. The third lens group preferably disposes lens components, in order from the object side, negative-negative-positive with disposing air spaces between them. Moreover, in the third lens group, it is preferable that one lens component is a cemented lens and two lens components are single lenses.

In an imaging lens according to the present embodiment, the fourth lens group, which is the sub-lens group, preferably includes one positive lens component and two negative lens components. The fourth lens group preferably disposes lens components, in order from the object side, negative-negative-positive with disposing air spaces between them. Moreover, in the fourth lens group, it is preferable that one lens component is a cemented lens and two lens components are single lenses.

In an imaging lens according to the present embodiment, although the zoom ratio is about 2 to 2.5, the imaging lens may be a fixed-focal-length lens that does not vary the focal length. Moreover, an angle of view is preferably 100 degrees or more in the wide-angle end state and about 50 degrees in the telephoto end state.

Figure 23:
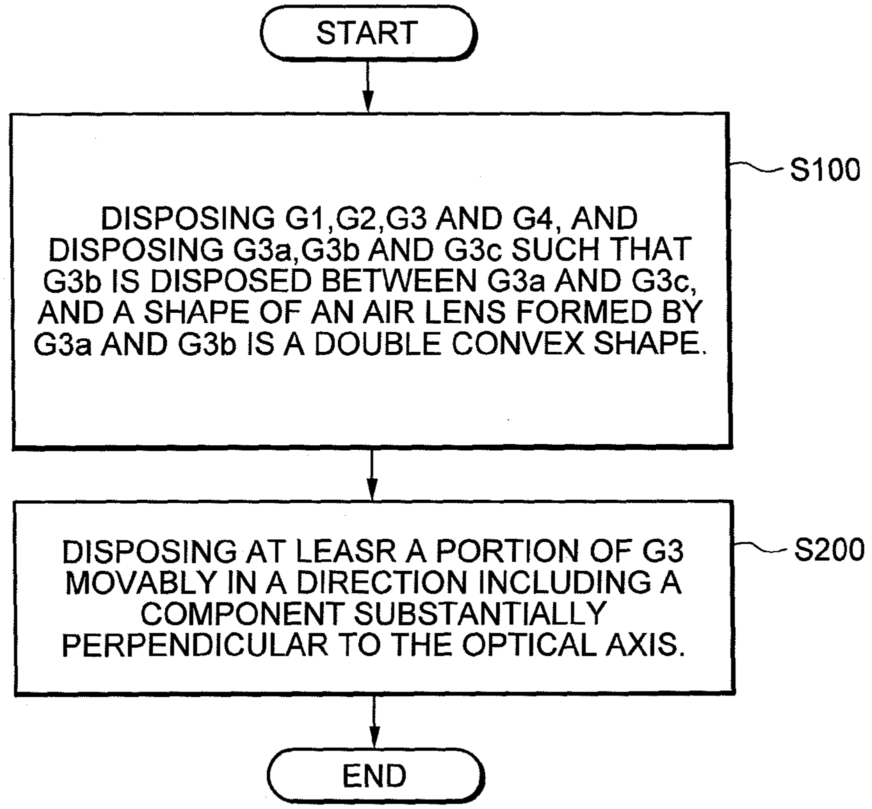
FIG. 23 is an explanatory flowchart of a method for manufacturing the imaging lens according to the present embodiment.

Then, an outline of a method for manufacturing an imaging lens according to the present embodiment is explained below with reference to FIG. 23. Although an example using an imaging lens with a four-lens-group configuration is explained, an example using a five-lens-group configuration has the same effect.

Step S100: providing each lens group with disposing each lens. In this instance, a front lens group composed of a first lens group is disposed to the most object side, and a rear lens group composed of, in order from the front lens group to the image side, a second lens group having positive refractive power, a third lens group having negative refractive power, and a fourth lens group having positive refractive power is disposed.

The third lens group, which is a sub-lens group of the rear lens group, is disposed, in order from the object side, a first negative lens component with a negative meniscus shape having negative refractive power, a second negative lens component having negative refractive power, and a positive lens component having positive refractive power. In this instance, a second negative lens component side lens surface of the first negative lens component has a concave surface facing the second negative lens component side, and a meniscus shape of the second negative lens component has a concave surface facing the first negative lens component side. With this configuration, the shape of the air lens formed by the first negative lens component and the second negative lens component has a double convex shape.

Step S200: disposing at least a portion of the third lens group, which is the sub-lens group, movably in a direction including a component substantially perpendicular to the optical axis.

Specifically, with reference to Example 1 explained later, an imaging lens according to the present embodiment includes, in order from the object side, a first lens group as a front lens group, and a second lens group through a fourth lens group as a rear lens group including a third lens group as a sub-lens group.

The first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed by resin layer on the image side lens surface, and a double convex positive lens L14.

The second lens group G2 is composed of, in order from the object side, a cemented lens CL21 constructed by a negative meniscus lens L21 having a convex surface facing the object side cemented with a double convex positive lens L22, and a double convex positive lens L23.

An aperture stop S is disposed between the second lens group G2 and the third lens group G3.

The third lens group G3 is composed of, in order from the object side, a first negative lens component G3*a* composed of a cemented lens CL31 constructed by a positive meniscus lens (positive lens) L31 having a concave surface facing the object side cemented with a double concave negative lens (negative lens) L32, a second negative lens component G3*b* composed of a negative meniscus lens L33 having a concave surface facing the first negative lens component G3*a* side, and a positive lens component G3*c* composed of a double convex positive lens L34.

The fourth lens group G4 is composed of, in order from the object side, a triple-cemented lens CL41 constructed by a double convex positive lens L41 cemented with a double concave negative lens L42 cemented with a double convex positive lens L43, and a triple cemented lens CL42 constructed by a negative meniscus lens L44 having a convex surface facing the object side cemented with a double convex positive lens L45 cemented with a negative meniscus lens L46 having a concave surface facing the object side and an aspherical surface formed on the image side lens surface.

Each lens group provided in this manner and optical members are disposed in a lens barrel, thereby manufacturing the imaging lens.

In this instance, at least a portion of the third lens group G3 as the sub-lens group is disposed movably in a direction including a component substantially perpendicular to the optical axis (step S200). Accordingly, an imaging lens according to the present embodiment is manufactured in this manner.

Then, each numerical example of an imaging lens according to the present embodiment is explained with reference to accompanying drawings.

Example 1

FIG. 1 is a sectional view showing a configuration of an imaging lens according to Example 1. The imaging lens SL1 according to Example 1 has a four-lens-group configuration, and is composed of, in order from an object side, a front lens group, which is a first lens group G1 having negative refractive power, and a rear lens group composed of a second lens group G2 having positive refractive power, a third lens group G3 having negative refractive power, and a fourth lens group G4 having positive refractive power.

In Example 1, upon zooming from a wide-angle end state (W) to a telephoto end state (T), each distance between lens groups varies such that a distance between the first lens group G1 and the second lens group G2 decreases, a distance between the second lens group G2 and the third lens group G3 increases, and a distance between the third lens group G3 and the fourth lens group G4 decreases. An aperture stop S is disposed between the second lens group G2 and the third lens group G3, and is moved in a body with the third lens group G3 upon zooming.

The first lens group G1 is composed of, in order from the object side, a negative meniscus lens L11 having a convex surface facing the object side and aspherical surfaces formed on both sides, a double concave positive (sic) lens L12, a double concave negative lens L13 having an aspherical surface formed by a resin layer on the image plane I side, and a double convex positive lens L14.

Moreover, an antireflection coating explained later is formed on the image plane I side lens surface (surface number 2) of the negative meniscus lens L11 and the object side lens surface (surface number 3) of the double concave negative lens L12 in the first lens group G1.

The second lens group G2 is composed of, in order from the object side, a cemented lens CL21 constructed by a negative meniscus lens L21 having a convex surface facing the object side cemented with a double convex positive lens L22, and a double convex positive lens L23.

In Example 1, with moving the cemented lens CL21 in the second lens group G2 along the optical axis from the object side to the image plane I side, focusing from an infinitely distant object to a close object can be carried out. In this manner, with applying an internal focusing system to the imaging lens, it becomes possible to reduce a load on a focusing motor upon auto focus, so that quick driving and electric power saving can be achieved.

The third lens group G3, which is the sub-lens group, is composed of, in order from the object side, a first negative lens component **G3*a*, a second negative lens component G3*b*, and a positive lens component G3*c***.

The first negative lens component **G3*a* is composed of a cemented lens CL31 constructed by, in order from the object side, a positive meniscus lens L31 having a concave surface facing the object side cemented with a double concave negative lens L32. The second negative lens component G3*b* is composed of a negative meniscus lens L33 having a concave surface facing the first negative lens component G3*a* side. The positive lens component G3*c* is composed of a double convex positive lens L34**.

In Example 1, with shifting the first negative lens component **G3*a* in a direction including a component substantially perpendicular to the optical axis, an image shifting on the image plane I is carried out. Accordingly, the imaging lens SL1 according to Example 1 makes it possible to make a correction of an image blur (vibration reduction) that is a correction of variation in an image position on the image plane I caused by vibrations of an optical apparatus including the imaging lens SL1**, which is also called as a camera shake. Incidentally, the aperture stop S is preferably not moved in a direction substantially perpendicular to the optical axis upon vibration reduction.

The second negative lens component **G3*b* side lens surface of the first negative lens component G3*a* is a concave surface facing the second negative lens component G3*b* side. The second negative lens component G3*b* has a negative meniscus shape having a concave surface facing the first negative lens component G3*a* side. In this manner, the shape of an air lens formed by the first negative lens component G3*a* and the second negative lens component G3*b* is a double convex shape. With this configuration, decentering coma and inclination of the image plane generated upon shifting the vibration reduction lens group G3*a*** in a direction including a component substantially perpendicular to the optical axis can be excellently corrected.

Moreover, in Example 1, the first negative lens component **G3*a* is the cemented lens CL31** whose cemented surface is a concave surface facing the aperture stop S side. With this configuration, it becomes possible to correct chromatic difference in curvature of field, in particular, chromatic difference in curvature of field in the telephoto state.

Moreover, in Example 1, with disposing the positive lens component **G3*c* having positive refractive power to the fourth lens group G4 side of the third lens group G3, it becomes possible to prevent the diameter of the fourth lens group G4** from getting larger, which is a common problem in a super wide-angle zoom lens, without deteriorating vibration reduction performance.

The fourth lens group G4 is composed of, in order from the object side, a triple-cemented lens CL41 constructed by a double convex positive lens L41 cemented with a double concave negative lens L42 cemented with a double convex positive lens L43, and a triple-cemented lens CL42 constructed by a negative meniscus lens L44 having a convex surface facing the object side cemented with a double convex positive lens L45 cemented with a negative meniscus lens L46 having a concave surface facing the object side and an aspherical surface formed on the image side surface.

Various values associated with the imaging lens SL1 according to Example 1 are listed in Table 1. In (Specifications) in Table 1, W denotes a wide-angle end state, M denotes an intermediate focal length state, T denotes a telephoto end state, f denotes a focal length, FNO denotes an f-number, 2ω denotes an angle of view (unit: degree), and Bf denotes a back focal length, Y denotes an image height, and TL denotes a total lens length that is a distance along the optical axis between the first lens surface and the image plane I upon focusing on infinity. In (Lens Surface Data) in Table 1, "OS" denotes an object surface, "I" denotes an image plane, a surface number "i" represents an order of the lens surface from the object side along the direction in which the light beams travel, "r" denotes a radius of curvature of each optical surface, a distance "d" indicates a distance along an optical axis from each optical surface to the next optical surface, and a refractive index "nd" and an Abbe number "νd" represent values with respect to d-line (wavelength λ=587.6 nm). In (Lens Group Data), "S" denote a start surface number.

An aspherical surface is expressed by the following expression where y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of a reference sphere, k is a conical coefficient and An is an n-th order aspherical surface coefficient:

$$S(y)=(y^2/r)/\left[1+(1-k\times y^2/r^2)^{1/2}\right]+A3\times|y|^3+A4\times y^4+A5\times|y|^5+A6\times y^6+A7\times|y|^7+A8\times y^8+A9\times|y|^9+A10\times y^{10}+A11\times|y|^{11}+A12\times y^{12}.$$

It should be noted that a second order aspherical surface coefficient A2 is "0" in each of Example. Incidentally, [E-n] represents [$\times10^{-n}$]. Further, the aspherical surface is attached with a mark "*" on the left side of a surface number in Table of each Example.

In (Variable Distances), f denotes a focal length, di denotes a variable distance at the surface number "i", and Bf denotes a back focal length. In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. Incidentally, the radius of curvature "r=∞" indicates a plane surface, and the refractive index "nd=1.00000" of the air is omitted. The explanation of reference symbols is the same in the other Examples. In Example 1, values of aspherical coefficients A3, A5, A7, A9 and A11 are 0, respectively.

TABLE 1

(Specifications)

| | W | M | T |
|---|---|---|---|
| f = | 16.48 | 24.00 | 33.94 |
| FNO = | 4.1 | 4.1 | 4.1 |
| 2ω = | 108° | 84° | 63° |
| Y = | 21.64 | 21.64 | 21.64 |
| TL = | 169.18 | 160.72 | 165.24 |

(Lens Surface Data)

| i | r | d | nd | νd |
|---|---|---|---|---|
| OS | ∞ | ∞ | | |
| *1 | 64.361 | 3.00 | 1.76690 | 46.85 |
| *2 | 14.627 | 11.25 | | |
| 3 | −118.914 | 1.55 | 1.88300 | 40.76 |
| 4 | 261.338 | 2.85 | | |
| 5 | −57.268 | 1.50 | 1.88300 | 40.76 |
| 6 | 52.742 | 0.40 | 1.55389 | 38.09 |
| *7 | 96.287 | 1.50 | | |
| 8 | 42.407 | 6.40 | 1.69895 | 30.13 |
| 9 | −65.202 | (d9) | | |
| 10 | 36.176 | 1.05 | 1.84666 | 23.78 |
| 11 | 19.297 | 4.95 | 1.60342 | 38.01 |
| 12 | −121.274 | 4.70 | | |
| 13 | 65.310 | 3.10 | 1.51823 | 58.93 |
| 14 | −65.310 | (d14) | | |
| 15 | ∞ | 3.26 | Aperture Stop S | |
| 16 | −137.621 | 2.10 | 1.70154 | 41.17 |
| 17 | −31.799 | 1.00 | 1.88300 | 40.76 |
| 18 | 35.395 | 2.90 | | |
| 19 | −24.463 | 0.80 | 1.88300 | 40.76 |
| 20 | −40.108 | 0.15 | | |
| 21 | 75.282 | 2.70 | 1.84666 | 23.78 |
| 22 | −61.234 | (d22) | | |
| 23 | 29.863 | 8.00 | 1.49782 | 82.51 |
| 24 | −43.301 | 1.10 | 1.83400 | 37.16 |
| 25 | 75.908 | 5.95 | 1.49782 | 82.51 |
| 26 | −47.092 | 0.15 | | |
| 27 | 39.817 | 1.10 | 1.88300 | 40.76 |
| 28 | 20.500 | 12.15 | 1.48749 | 70.41 |
| 29 | −40.025 | 1.60 | 1.80610 | 40.77 |
| *30 | −72.448 | (Bf) | | |
| IP | ∞ | | | |

TABLE 1-continued (Lens Group Data)

| Group | S | Focal Length |
|---|---|---|
| G1 | 1 | −21.30 |
| G2 | 10 | 34.14 |
| G3 | 16 | −46.90 |
| G4 | 23 | 50.02 |

(Aspherical Surface Data)

Surface Number: 1

κ = 1.000
A4 = −8.262E−06
A6 = 1.472E−08
A8 = −1.057E−11
A10 = 7.575E−15
A12 = −2.361E−18

Surface Number: 2

κ = 0.017
A4 = −6.389E−06
A6 = −3.010E−08
A8 = 8.699E−11
A10 = 0.000E+00
A12 = 0.000E+00

Surface Number: 7

κ = 8.352
A4 = 1.862E−05
A6 = 1.672E−08
A8 = −3.678E−11
A10 = 0.000E+00
A12 = 0.000E+00

Surface Number: 30

κ = 12.401
A4 = 1.208E−05
A6 = 1.539E−08
A8 = −2.918E−11
A10 = 1.594E−13
A12 = 4.038E−18

(Variable Distances)

| | W | M | T |
|---|---|---|---|
| f = | 16.48 | 23.99 | 33.94 |
| d9 = | 28.97 | 11.94 | 2.09 |
| d14 = | 3.26 | 6.00 | 8.50 |
| d22 = | 12.46 | 5.96 | 1.21 |
| Bf = | 38.60 | 50.93 | 67.55 |

(Values for Conditional Expressions)

Fg3 = −46.902
Fg3c = 40.248
(1) r1 = 35.395 r2 = −24.463
(2) Fa = 0.31
(3) Fb = 0.86

Figure 4A:
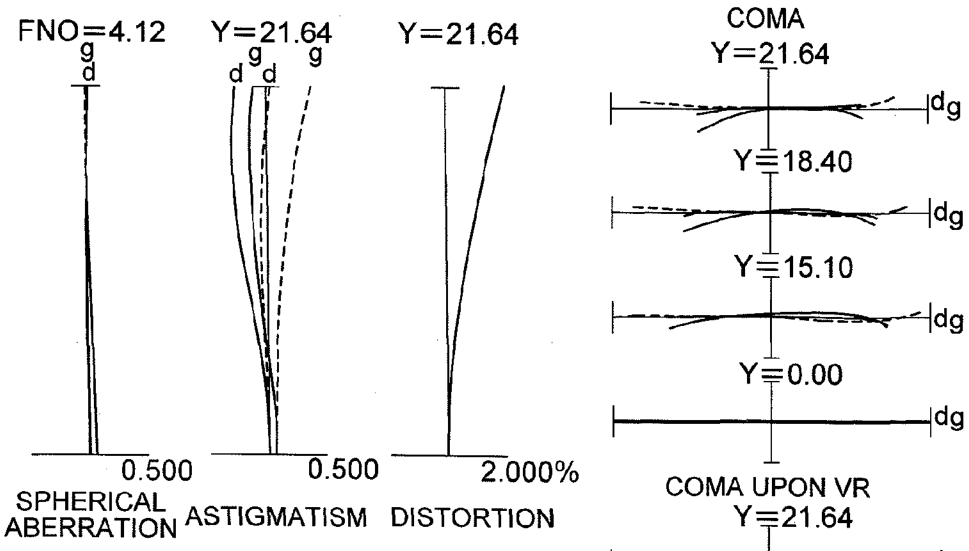
Figure 4B:
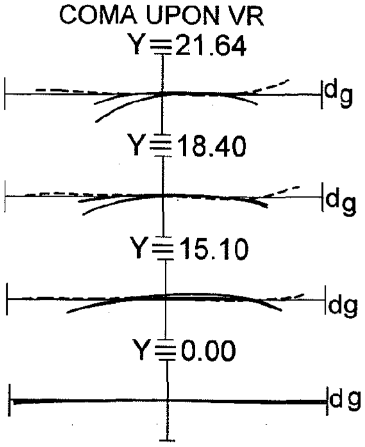

FIGS. 2A and 2B to FIGS. 4A and 4B are graphs of various aberrations of the imaging lens SL1 according to Example 1 upon focusing on infinity. FIGS. 2A and 2B show various aberrations in a wide-angle end state upon focusing on infinity, in which FIG. 2A shows various aberrations without vibration reduction, and FIG. 2B shows coma upon vibration reduction. FIGS. 3A and 3B show various aberrations in an intermediate focal length state upon focusing on infinity, in which FIG. 3A shows various aberrations without vibration reduction, and FIG. 3B shows coma upon vibration reduction. FIGS. 4A and 4B show various aberrations in a telephoto end state upon focusing on infinity, in which FIG. 4A shows various aberrations without vibration reduction, and FIG. 4B shows coma upon vibration reduction. Here, coma upon VR shows value of coma upon carrying out vibration reduction with shifting the first negative lens component G3*a* in a direction substantially perpendicular to the optical axis by an amount of 0.2 mm.

In respective graphs, FNO denotes an f-number, Y denotes an image height, d indicates an aberration curve with respect to d-line (λ=587.6 nm) and g indicates an aberration curve with respect to the g-line (λ=435.8 nm), respectively. In respective graphs showing the astigmatism, a solid line indicates a sagittal image plane, and a broken line indicates a meridional image plane. In respective graphs showing spherical aberration, a solid line shows spherical aberration, and a broken line shows sine condition. Note that the descriptions of these graphs are the same with the subsequent Examples.

As is apparent from the respective graphs shown in FIGS. 2A, and 2B to FIGS. 4A and 4B the imaging lens SL1 according to Example 1 shows superb optical performance as a result of good corrections to various aberrations in each focal length state from the wide-angle end state through the telephoto end state, even upon shifting the vibration reduction lens group.

Figure 5:
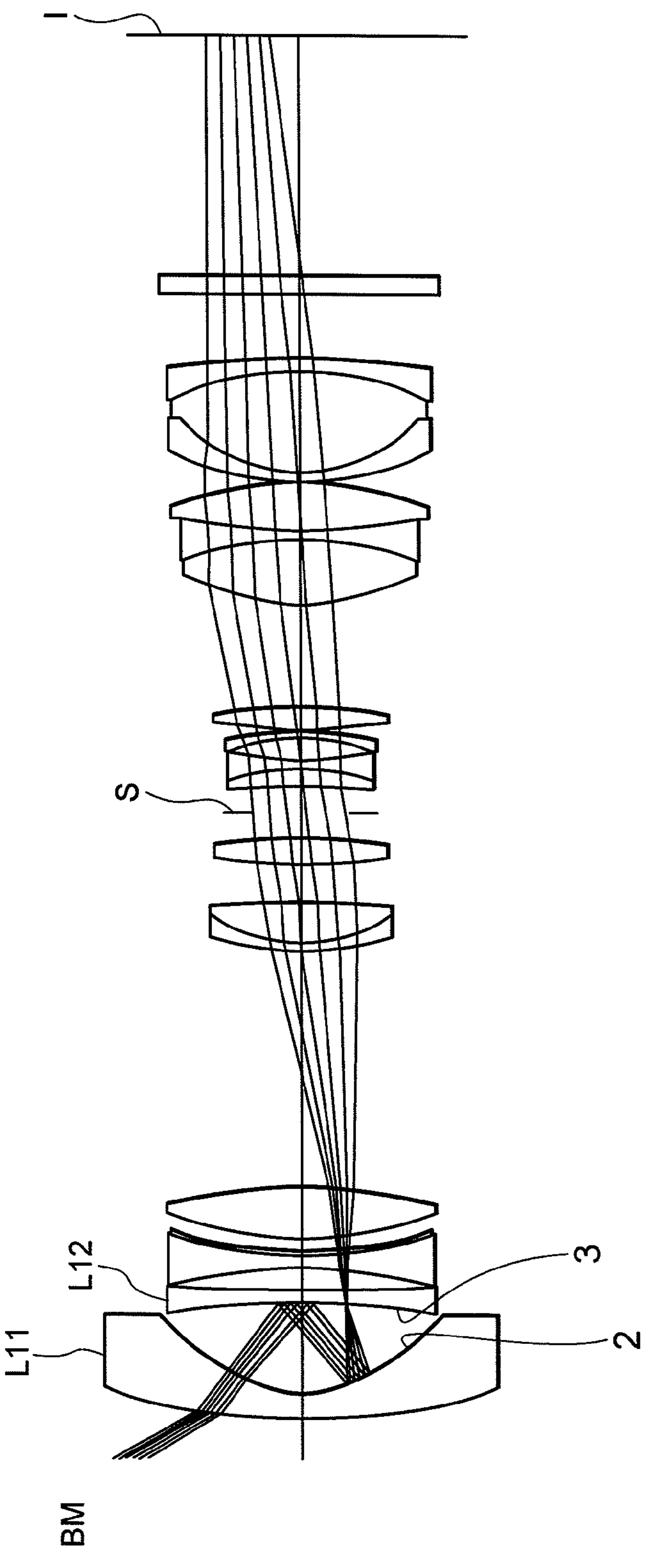
FIG. 5 is a sectional view showing the configuration of the imaging lens according to Example 1, illustrating one example of how incident light beams are reflected by a first-ghost-image-generating surface and a second-ghost-image-generating surface.

FIG. 5 is a view illustrating one example of how incident light beams ghost images by optical surfaces when light beams are incident on an imaging lens having similar configuration to the configuration of the imaging lens according to Example 1.

In FIG. 5, when light beams BM from an object are incident on the imaging lens, the light beams are reflected by the object side lens surface (a first-ghost-image-generating surface whose surface number is three) of the double concave negative lens L12 of the first lens group G1, and the reflected light beams are reflected again by the image side surface (a second-ghost-image-generating surface whose surface number is two) of the negative meniscus lens L11 of the first lens group G1 to reach the image plane I with generating ghost images. Incidentally, the first-ghost-image-generating surface 3, and the second-ghost-image-generating surface 2 are both concave surfaces. With forming an antireflection coating corresponding to a broader wavelength range and a wider angle of incidence, it becomes possible to effectively suppress ghost images.

Accordingly, in the imaging lens SL1 according to Example 1, with applying an antireflection coating explained later to the image plane I side surface (concave surface facing the image plane I side) of the negative meniscus lens L11 of the first lens group G1 and the object side lens surface (concave surface facing the object side) of the double concave negative lens L12 of the first lens group G1, it becomes possible to reduce ghost images and flare. Incidentally, the function and the effect of the antireflection coating are the same in the other Examples, so that detailed explanations with respect to the other Examples are omitted.

In this manner, the imaging lens SL1 according to Example 1 makes it possible to realize a super wide-angle, high zoom ratio zoom lens capable of zooming from a super-wide angle of view of 100 degrees or more to a standard angle of view of about 50 degrees, having high optical performance with excellently correcting various aberrations upon vibration reduction and suppressing ghost images and flare.

Example 2

Figure 6:
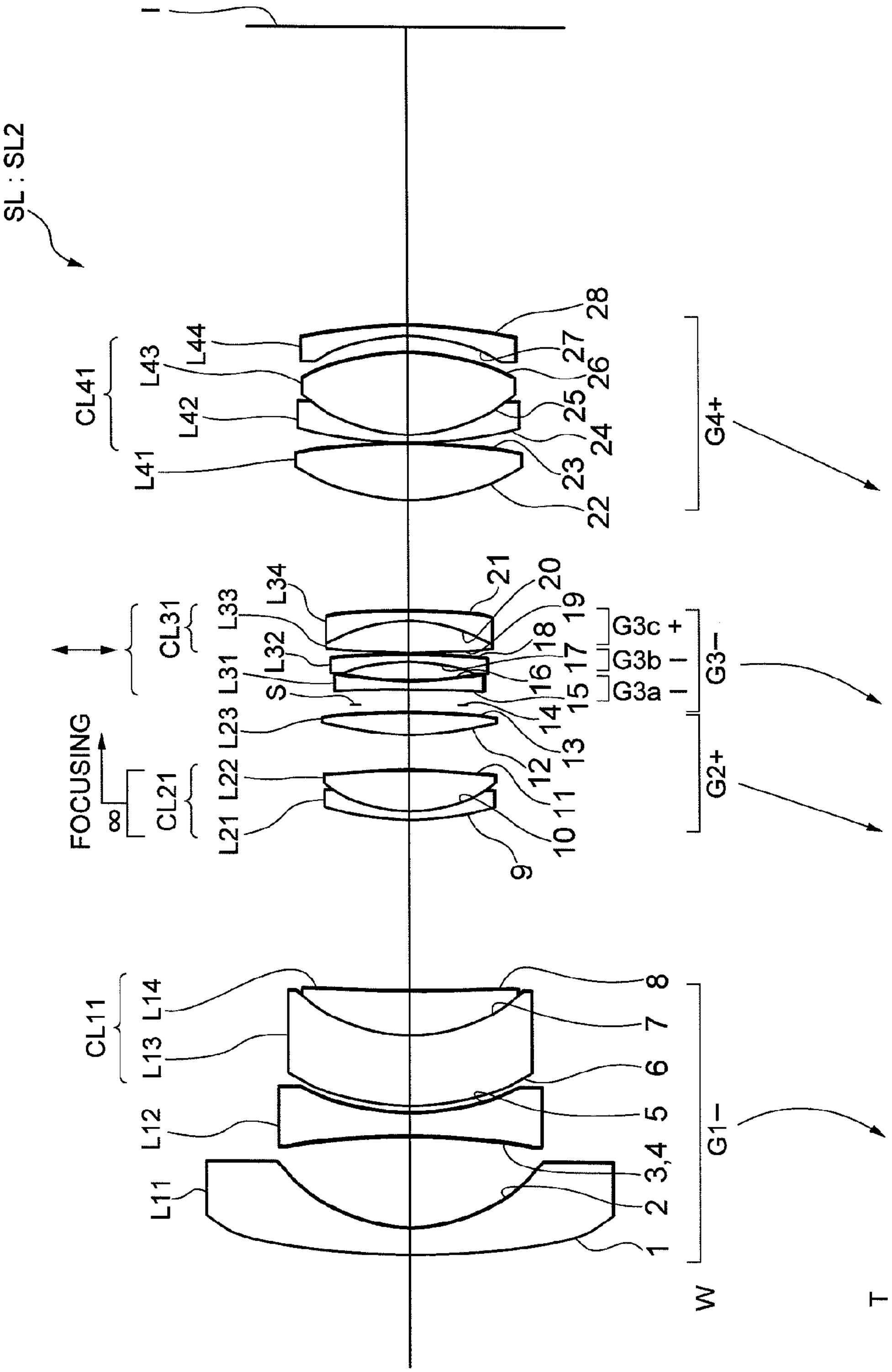
FIG. 6 is a sectional view showing a configuration of an imaging lens according to Example 2 in a wide-angle end state and a zoom trajectory of each lens group upon zooming.

FIG. 6 is a sectional view showing a configuration of an imaging lens according to Example 2. The imaging lens SL2 according to Example 2 has a four-lens-group configuration, and is composed of, in order from an object side, a front lens group, which is a first lens group G1 having negative refractive power, and a rear lens group composed of a second lens group G2 having positive refractive power, a third lens group G3 having negative refractive power, and a fourth lens group G4 having positive refractive power.

In Example 2, upon zooming from a wide-angle end state (W) to a telephoto end state (T), each distance between lens groups varies such that a distance between the first lens group G1 and the second lens group G2 decreases, a distance between the second lens group G2 and the third lens group G3 increases, and a distance between the third lens group G3 and the fourth lens group G4 decreases. An aperture stop S is disposed between the second lens group G2 and the third lens group G3, and is moved in a body with the third lens group G3 upon zooming.

The first lens group G1 is composed of, in order from the object side, a negative meniscus lens L11 having convex surface facing the object side and aspherical surfaces formed on both sides, a double concave negative lens L12 having an aspherical surface formed by a resin layer on the object side lens surface, and a cemented lens CL11 constructed by a negative meniscus lens L13 having a convex surface facing the object side cemented with a positive meniscus lens L14 having a convex surface facing the object side.

An antireflection coating explained later is applied on the image plane I side surface (surface number 2) of the negative meniscus lens L11 and the object side surface (surface number 3) of the double concave negative lens L12 of the first lens group G1.

The second lens group G2 is composed of, in order from the object side, a cemented lens CL21 constructed by a negative meniscus lens L21 having a convex surface facing the object side cemented with a double convex positive lens L22, and a double convex positive lens L23.

In Example 2, with moving the cemented lens CL21 in the second lens group along the optical axis from the object side to the image plane I side, focusing from an infinitely distant object to a close object can be carried out. In this manner, with applying an internal focusing system to the imaging lens, it becomes possible to reduce a load on a focusing motor upon auto focusing, so that quick driving and electric power saving can be achieved.

The third lens group G3, which is the sub-lens group, is composed of, in order from the object side, a first negative lens component G3*a*, a second negative lens component G3*b*, and a positive lens component G3*c*.

The first negative lens component G3*a* is composed of a double concave negative lens L31. The second negative lens component G3*b* is composed of a negative meniscus lens L32 having a concave surface facing the first negative lens component G3*a* side. The positive lens component G3*c* is composed of a cemented lens CL31 constructed by a double convex positive lens L33 cemented with a negative meniscus lens L34 having a concave surface facing the object side.

In the imaging lens SL2 according to Example 2, with shifting the whole of the third lens group G3 in a direction including a component substantially perpendicular to the optical axis, an image shifting on the image plane I is carried out. Accordingly, the imaging lens SL2 according to Example 2 makes it possible to make a correction of an image blur (vibration reduction) that is a correction of variation in an image position on the image plane I caused by vibrations of an optical apparatus including the imaging lens SL2, which is also called as a camera shake. Incidentally, the aperture stop S is preferably not moved in a direction substantially perpendicular to the optical axis upon vibration reduction.

The second negative lens component G3*b* side lens surface of the first negative lens component G3*a* is a concave surface facing the second negative lens component G3*b* side. The second negative lens component G3*b* has a negative meniscus shape having a concave surface facing the first negative lens component G3*a* side. In this manner, the shape of an air lens formed by the first negative lens component G3*a* and the second negative lens component G3*b* is a double convex shape. With this configuration, decentering coma and inclination of the image plane generated upon shifting the vibration reduction lens group G3*a* in a direction including a component substantially perpendicular to the optical axis can be excellently corrected.

Moreover, in Example 2, with forming the positive lens component G3*c* out of the cemented lens CL31 whose cemented surface is a concave surface facing the aperture stop S side, it becomes possible to correct chromatic difference in curvature of field, in particular, chromatic difference in curvature of field in the telephoto state. Moreover, with disposing the positive lens component G3*c* having positive refractive power to the fourth lens group G4 side of the third lens group G3, which is the vibration reduction lens group, it becomes possible to prevent the diameter of the fourth lens group G4 from getting larger, which is a common problem in a super wide-angle zoom lens.

The fourth lens group G4 is composed of, in order from the object side, a double convex positive lens L41, a cemented lens CL41 constructed by a negative meniscus lens L42 having a convex surface facing the object side cemented with a double convex positive lens L43, and a negative meniscus lens L44 having a concave surface facing the object side and an aspherical surface formed on the image plane I side lens surface.

Various values associated with the imaging lens SL2 according to Example 2 are listed in Table 2.

TABLE 2

(Specifications)

| | W | M | T |
|---|---|---|---|
| f = | 17.50 | 24.00 | 38.79 |
| FNO = | 4.1 | 4.1 | 4.1 |
| 2ω = | 104° | 84° | 57°30' |
| Y = | 21.64 | 21.64 | 21.64 |
| TL = | 159.84 | 155.85 | 163.47 |

(Lens Surface Data)

| i | r | d | nd | νd |
|---|---|---|---|---|
| OS | ∞ | ∞ | | |
| *1 | 285.248 | 3.50 | 1.76684 | 46.82 |
| *2 | 20.074 | 11.76 | | |
| *3 | −269.558 | 0.25 | 1.55389 | 38.09 |
| 4 | −95.687 | 3.27 | 1.88187 | 40.79 |
| 5 | 35.217 | 0.80 | | |
| 6 | 33.379 | 9.22 | 1.69871 | 47.23 |
| 7 | 22.433 | 5.73 | 1.77318 | 28.06 |
| 8 | 276.442 | (d8) | | |
| 9 | 37.821 | 1.25 | 1.84666 | 23.78 |
| 10 | 19.478 | 5.37 | 1.58054 | 49.99 |
| 11 | −93.943 | 4.66 | | |
| 12 | 41.856 | 2.81 | 1.53389 | 61.70 |
| 13 | −107.463 | (d13) | | |
| 14 | ∞ | 2.20 | Aperture Stop S | |
| 15 | −198.716 | 1.00 | 1.87595 | 40.93 |
| 16 | 48.008 | 2.59 | | |
| 17 | −26.534 | 1.00 | 1.62877 | 43.36 |
| 18 | −100.404 | 0.15 | | |
| 19 | 110.984 | 4.29 | 1.84521 | 23.81 |
| 20 | −20.833 | 1.00 | 1.83412 | 32.29 |
| 21 | −92.619 | (d21) | | |
| 22 | 27.384 | 7.46 | 1.49782 | 82.51 |
| 23 | −81.909 | 0.13 | | |
| 24 | 57.701 | 1.00 | 1.86501 | 30.28 |
| 25 | 22.148 | 10.49 | 1.48749 | 70.40 |
| 26 | −31.702 | 2.32 | | |
| 27 | −24.258 | 1.30 | 1.86465 | 30.12 |
| *28 | −49.581 | (Bf) | | |
| I | ∞ | | | |

TABLE 2-continued (Lens Group Data)

| Group | S | Focal Length |
|---|---|---|
| G1 | 1 | −21.16 |
| G2 | 9 | 33.02 |
| G3 | 15 | −46.91 |
| G4 | 22 | 46.76 |

(Aspherical Surface Data)

Surface Number: 1

κ = 109.078
A3 = 0.000E+00
A4 = 1.027E−05
A5 = 0.000E+00
A6 = −1.820E−08
A7 = 0.000E+00
A8 = 2.717E−11
A9 = 0.000E+00
A10 = −2.444E−14
A11 = 0.000E+00
A12 = 1.301E−17

Surface Number: 2

κ = 0.883
A3 = −5.384E−05
A4 = 5.585E−06
A5 = −1.386E−06
A6 = 5.799E−08
A7 = 4.592E−10
A8 = −1.131E−10
A9 = 0.000E+00
A10 = 0.000E+00
A11 = 0.000E+00
A12 = 0.000E+00

Surface Number: 3

κ = 185.041
A3 = 0.000E+00
A4 = −1.324E−05
A5 = 0.000E+00
A6 = 2.165E−08
A7 = 0.000E+00
A8 = −6.754E−11
A9 = 0.000E+00
A10 = −8.208E−16
A11 = 0.000E+00
A12 = 0.000E+00

Surface Number: 28

κ = 1.072
A3 = 2.375E−05
A4 = 4.763E−06
A5 = 5.589E−07
A6 = −3.429E−09
A7 = −1.344E−09
A8 = 1.100E−10
A9 = 0.000E+00
A10 = 0.000E+00
A11 = 0.000E+00
A12 = 0.000E+00

TABLE 2-continued

| (Variable Distances) | | | |
|---|---|---|---|
| | W | M | T |
| f = | 17.51 | 24.00 | 38.79 |
| d8 = | 22.34 | 11.38 | 1.04 |
| d13 = | 1.00 | 5.47 | 12.50 |
| d21 = | 14.50 | 10.03 | 3.00 |
| Bf = | 38.44 | 45.41 | 63.38 |

(Values for Conditional Expressions)

Fg3 = −46.906
Fg3c = 59.015
(1) r1 = 48.008 r2 = −26.534
(2) Fa = 0.45
(3) Fb = 1.26

Figure 7A:
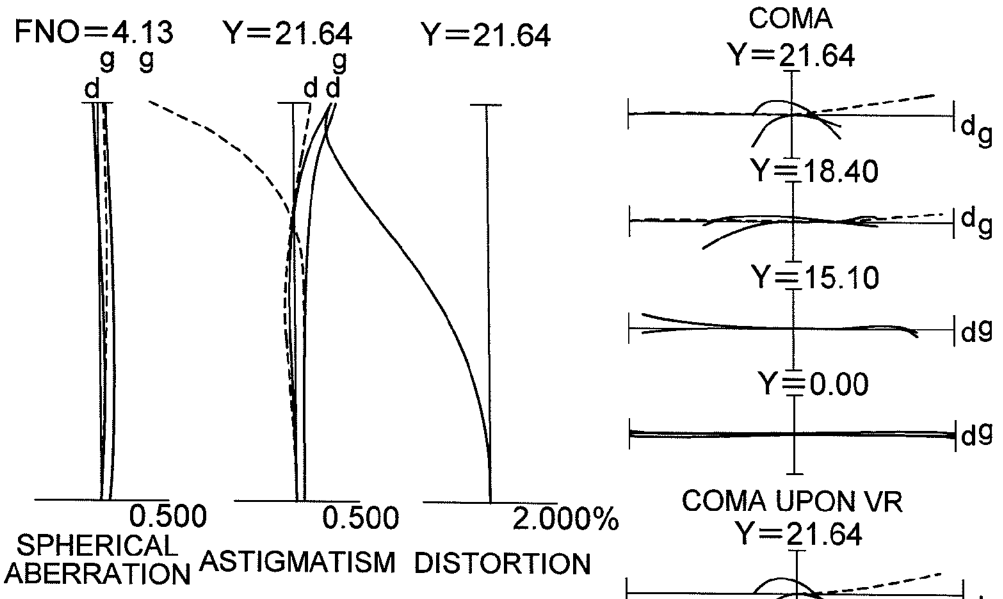
Figure 7B:
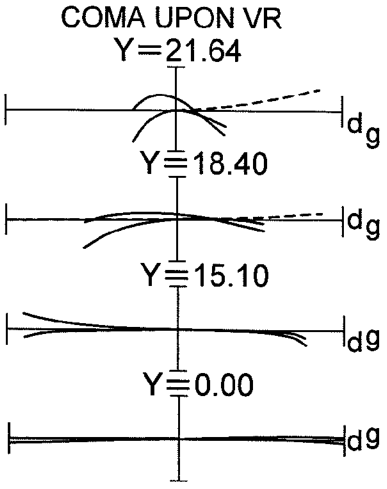
Figure 8A:
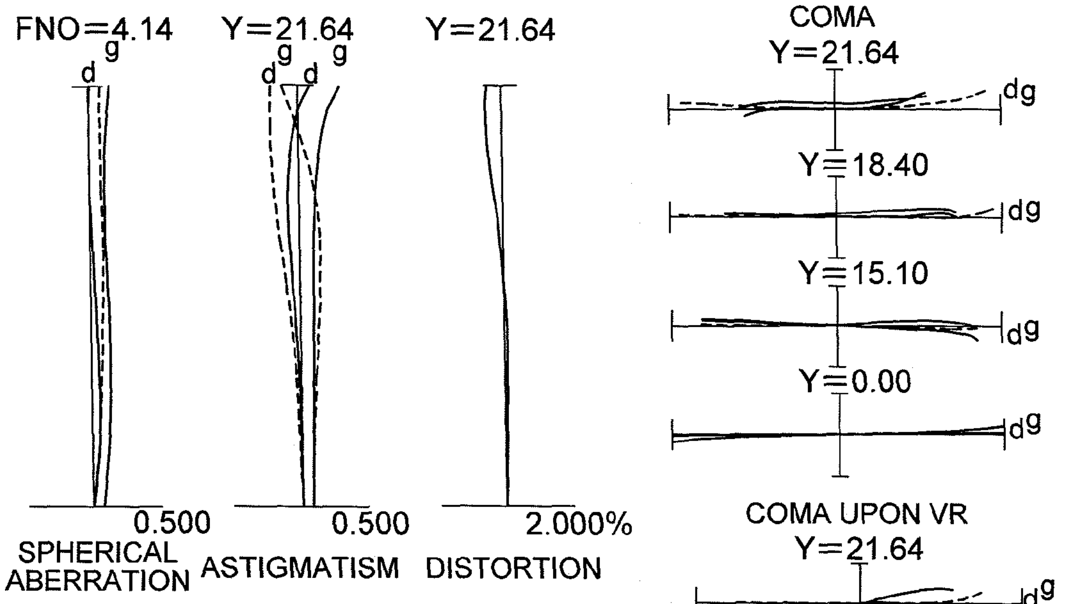
Figure 8B:
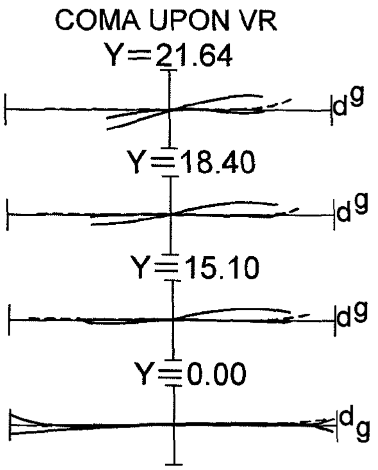

FIGS. 7A and 7B to FIGS. 9A and 9B are graphs of various aberrations of the imaging lens SL2 according to Example 2 upon focusing on infinity. FIGS. 7A and 7B show various aberrations in a wide-angle end state upon focusing on infinity, in which FIG. 7A shows various aberrations without vibration reduction, and FIG. 7B shows coma upon vibration reduction. FIGS. 8A and 8B show various aberrations in an intermediate focal length state upon focusing on infinity, in which FIG. 8A shows various aberrations without vibration reduction, and FIG. 8B shows coma upon vibration reduction. FIGS. 9A and 9B show various aberrations in a telephoto end state upon focusing on infinity, in which FIG. 9A shows various aberrations without vibration reduction, and FIG. 9B shows coma upon vibration reduction. Here, coma upon VR shows value of coma upon carrying out vibration reduction with shifting the whole of the third lens group G3 in a direction substantially perpendicular to the optical axis by an amount of 0.2 mm.

As is apparent from the respective graphs shown in FIGS. 7A and 7B to FIGS. 9A and 9B, the imaging lens SL2 according to Example 2 shows superb optical performance as a result of good corrections to various aberrations in each focal length state from the wide-angle end state through the telephoto end state, even upon shifting the vibration reduction lens group.

In the imaging lens SL2 according to Example 2, with applying an antireflection coating explained later to the image plane I side lens surface (concave surface facing the image plane I side) of the negative meniscus lens L11 of the first lens group G1 and the object side lens surface (concave surface facing the object side) of the double concave negative lens L12 of the first lens group G1, it becomes possible to reduce ghost images and flare.

In this manner, the imaging lens SL2 according to Example 2 makes it possible to realize a super wide-angle, high zoom ratio zoom lens capable of zooming from a super-wide angle of view of 100 degrees or more to a standard angle of view of about 50 degrees, having high optical performance with excellently correcting various aberrations upon vibration reduction and suppressing ghost images and flare.

Example 3

Figure 10:
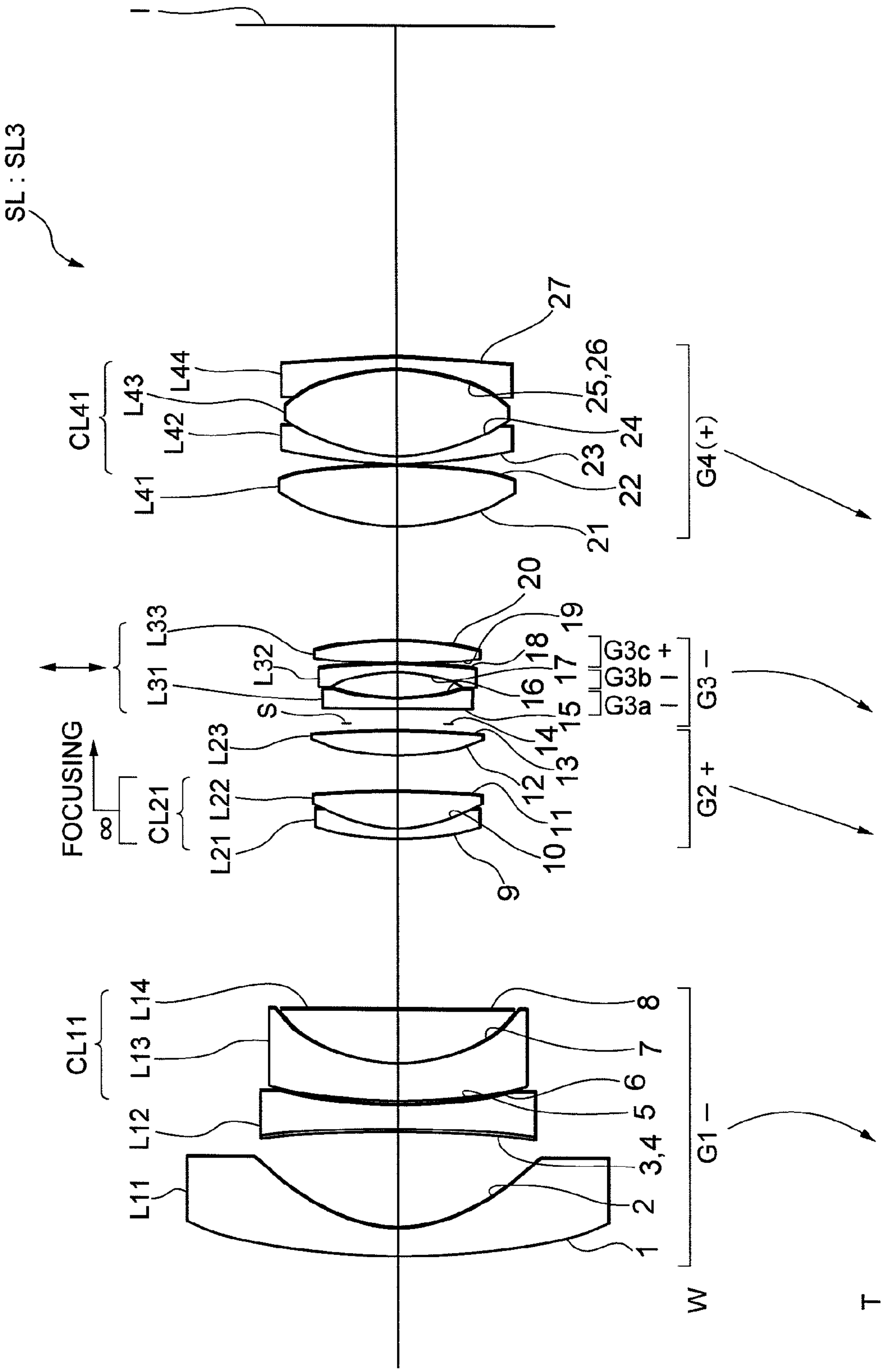
FIG. 10 is a sectional view showing a configuration of an imaging lens according to Example 3 in a wide-angle end state and a zoom trajectory of each lens group upon zooming.
Figures 12A, 12B:
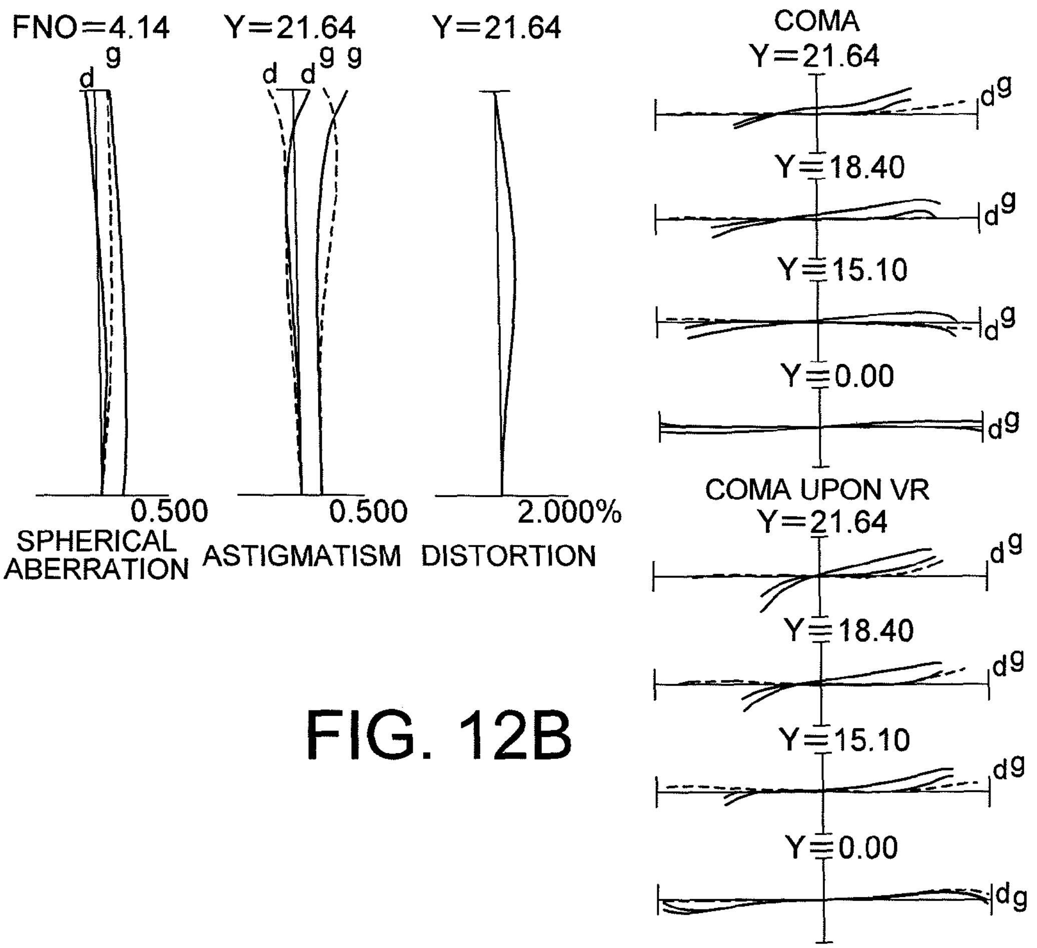

FIG. 10 is a sectional view showing a configuration of an imaging lens according to Example 3. The imaging lens SL3 according to Example 3 has a four-lens-group configuration and is composed of, in order from an object side, a front lens group, which is a first lens group G1 having negative refractive power, and a rear lens group composed of a second lens group G2 having positive refractive power, a third lens group G3 having negative refractive power, and a fourth lens group G4 having positive refractive power.

In Example 3, upon zooming from a wide-angle end state (W) to a telephoto end state (T), each distance between lens groups varies such that a distance between the first lens group G1 and the second lens group G2 decreases, a distance between the second lens group G2 and the third lens group G3 increases, and a distance between the third lens group G3 and the fourth lens group G4 decreases. An aperture stop S is disposed between the second lens group G2 and the third lens group G3, and is moved in a body with the third lens group G3 upon zooming.

The first lens group G1 is composed of, in order from the object side, a negative meniscus lens L11 having a convex surface facing the object side and aspherical surfaces formed on both sides, a double concave negative lens L12 having an aspherical surface formed by a resin layer on the object side lens surface, and a cemented lens CL11 constructed by a negative meniscus lens L13 having a convex surface facing the object side cemented with a positive meniscus lens L14 having a convex surface facing the object side.

An antireflection coating explained later is applied on the image side lens surface (surface number 2) of the negative meniscus lens L11 in the first lens group G1.

The second lens group G2 is composed of, in order from the object side, a cemented lens CL21 constructed by a negative meniscus lens L21 having a convex surface facing the object side cemented with a double convex positive lens L22, and a double convex positive lens L23.

In Example 3, with moving the cemented lens CL21 in the second lens group G2 along the optical axis from the object side to the image plane I side, focusing from an infinitely distant object to a close object can be carried out. In this manner, with applying an internal focusing system to the imaging lens, it becomes possible to reduce a load on a focusing motor upon auto focusing, so that quick driving and electric power saving can be achieved.

The third lens group G3, which is a sub-lens group, is composed of, in order from the object side, a first negative lens component G3*a*, a second negative lens component G3*b*, and a positive lens component G3*c*.

The first negative lens component G3*a* is composed of a negative meniscus lens L31 having a convex surface facing the object side. The second negative lens component G3*b* is composed of a negative meniscus lens L32 having a concave surface facing the first negative lens component G3*a* side. The positive lens component G3*c* is composed of a double convex positive lens L33.

In the imaging lens SL3 according to Example 3, with shifting the whole of the third lens group G3 in a direction including a component substantially perpendicular to the optical axis, an image shifting on the image plane I is carried out. Accordingly, the imaging lens SL3 according to Example 3 makes it possible to make a correction of an image blur (vibration reduction) that is a correction of variation in an image position on the image plane I caused by vibrations of an optical apparatus including the imaging lens SL3, which is also called as a camera shake. Incidentally, the aperture stop S is preferably not moved in a direction substantially perpendicular to the optical axis upon vibration reduction.

The second negative lens component G3*b* side lens surface of the first negative lens component G3*a* is a concave surface facing the second negative lens component G3*b* side. The second negative lens component G3*b* has a negative meniscus shape having a concave surface facing the first negative lens component G3*a* side. In this manner, the shape of an air lens formed by the first negative lens component G3*a* and the second negative lens component G3*b* is a double convex shape. With this configuration, decentering coma and inclination of the image plane generated upon shifting the vibration reduction lens group G3 in a direction including a component substantially perpendicular to the optical axis can be excellently corrected.

Moreover, in Example 3, with disposing the positive lens component G3*c* having positive refractive power to the fourth lens group G4 side of the third lens group G3, which is the vibration reduction lens group, it becomes possible to prevent the diameter of the fourth lens group G4 from getting larger, which is a common problem in a super wide-angle zoom lens.

The fourth lens group G4 is composed of, in order from the object side, a double convex positive lens L41, a cemented lens CL41 constructed by a negative meniscus lens L42 having a convex surface facing the object side cemented with a double convex positive lens L43, and a negative meniscus lens L44 having a concave surface facing the object side and an aspherical surface formed on the image side lens surface.

Various values associated with the imaging lens SL3 according to Example 3 are listed in Table 3.

TABLE 3

(Specifications)

| | W | M | T |
|---|---|---|---|
| f = | 17.51 | 24.00 | 38.80 |
| FNO = | 4.1 | 4.1 | 4.1 |
| 2ω = | 104° | 84° | 57°30' |
| Y = | 21.64 | 21.64 | 21.64 |
| TL = | 156.70 | 153.27 | 161.93 |

(Lens Surface Data)

| i | r | d | nd | νd |
|---|---|---|---|---|
| OS | ∞ | ∞ | | |
| *1 | 171.646 | 3.50 | 1.76684 | 46.80 |
| *2 | 19.739 | 12.50 | | |
| *3 | −539.637 | 0.25 | 1.55389 | 38.08 |
| 4 | −163.356 | 3.00 | 1.88183 | 40.58 |
| 5 | 60.741 | 0.61 | | |
| 6 | 78.448 | 4.82 | 1.74736 | 44.94 |
| 7 | 21.754 | 6.58 | 1.79075 | 26.83 |
| 8 | 362.657 | (d8) | | |
| 9 | 39.263 | 1.25 | 1.84767 | 24.10 |
| 10 | 20.304 | 4.64 | 1.56733 | 49.37 |
| 11 | −156.498 | 4.69 | | |
| 12 | 30.594 | 3.06 | 1.51340 | 65.05 |
| 13 | −150.945 | (d13) | | |
| 14 | ∞ | 1.87 | Aperture Stop S | |
| 15 | 455.200 | 1.36 | 1.86536 | 41.18 |
| 16 | 31.319 | 3.31 | | |
| 17 | −21.513 | 1.00 | 1.62874 | 51.57 |
| 18 | −103.940 | 0.17 | | |
| 19 | 117.993 | 2.85 | 1.84724 | 23.93 |
| 20 | −47.729 | (d20) | | |
| 21 | 29.259 | 7.81 | 1.49782 | 82.48 |
| 22 | −60.528 | 0.13 | | |
| 23 | 62.727 | 1.01 | 1.84875 | 33.25 |
| 24 | 26.012 | 11.02 | 1.48749 | 70.38 |
| 25 | −25.881 | 0.20 | | |
| 26 | −25.368 | 1.30 | 1.85026 | 32.33 |
| *27 | −71.523 | (Bf) | | |
| I | ∞ | | | |

(Lens Group Data)

| Group | S | Focal Length |
|---|---|---|
| G1 | 1 | −21.72 |
| G2 | 9 | 33.77 |
| G3 | 15 | −46.90 |
| G4 | 21 | 44.38 |

TABLE 3-continued (Aspherical Surface Data)

Surface Number: 1

κ = 19.790
A3 = 0.000E+00
A4 = 8.222E−06
A5 = 0.000E+00
A6 = −1.784E−08
A7 = 0.000E+00
A8 = 2.418E−11
A9 = 0.000E+00
A10 = −2.173E−14
A11 = 0.000E+00
A12 = 1.172E−17

Surface Number: 2

κ = 0.798
A3 = −2.823E−06
A4 = 5.117E−07
A5 = −1.385E−06
A6 = 7.438E−08
A7 = 6.674E−10
A8 = −1.955E−10
A9 = 0.000E+00
A10 = 0.000E+00
A11 = 0.000E+00
A12 = 0.000E+00

Surface Number: 3

κ = −0.170
A3 = 5.009E−05
A4 = −1.583E−05
A5 = 2.001E−07
A6 = 3.670E−08
A7 = 2.625E−10
A8 = −1.999E−10
A9 = −1.307E−12
A10 = 2.751E−13
A11 = 0.000E+00
A12 = 0.000E+00

Surface Number: 27

κ = −4.426
A3 = 2.057E−05
A4 = 6.247E−06
A5 = 3.689E−07
A6 = −5.252E−09
A7 = −1.105E−10
A8 = 4.572E−11
A9 = 0.000E+00
A10 = 0.000E+00
A11 = 0.000E+00
A12 = 0.000E+00

(Variable Distances)

| | W | M | T |
|---|---|---|---|
| f = | 17.51 | 24.00 | 38.80 |
| d8 = | 22.26 | 11.66 | 1.59 |
| d13 = | 1.00 | 5.59 | 12.67 |
| d20 = | 14.53 | 9.95 | 2.87 |
| Bf = | 41.98 | 49.15 | 67.87 |

(Values for Conditional Expressions)

Fg3 = −46.900
Fg3c = 40.428
(1) r1 = 31.319 r2 = −21.513
(2) Fa = 0.31
(3) Fb = 0.86

FIGS. 11A and 11B to FIGS. 13A and 13B are graphs of various aberrations of the imaging lens SL3 according to Example 3 upon focusing on infinity. FIGS. 11A and 11B show various aberrations in a wide-angle end state upon focusing on infinity, in which FIG. 11A shows various aberrations without vibration reduction, and FIG. 11B shows coma upon vibration reduction. FIGS. 12A and 12B show various aberrations in an intermediate focal length state upon focusing on infinity, in which FIG. 12A shows various aberrations without vibration reduction, and FIG. 12B shows coma upon vibration reduction. FIGS. 13A and 13B show various aberrations in a telephoto end state upon focusing on infinity, in which FIG. 13A shows various aberrations without vibration reduction, and FIG. 13B shows coma upon vibration reduction. Here, coma upon VR shows value of coma upon carrying out vibration reduction with shifting the whole of the third lens group G3 in a direction substantially perpendicular to the optical axis by an amount of 0.2 mm.

As is apparent from the respective graphs shown in FIGS. 11A and 11B to FIGS. 13A and 13B, the imaging lens SL3 according to Example 3 shows superb optical performance as a result of good corrections to various aberrations in each focal length state from the wide-angle end state through the telephoto end state, even upon shifting the vibration reduction lens group.

In the imaging lens SL3 according to Example 3, with applying an antireflection coating explained later to the image plane I side lens surface (concave surface facing the image plane I side) of the negative meniscus lens L11 of the first lens group G1, it becomes possible to reduce ghost images and flare.

In this manner, the imaging lens SL3 according to Example 3 makes it possible to realize a super wide-angle, high zoom ratio zoom lens capable of zooming from a super-wide angle of view of 100 degrees or more to a standard angle of view of about 50 degrees, having excellent optical performance with excellently correcting various aberrations upon vibration reduction and suppressing ghost images and flare.

Example 4

Figure 14:
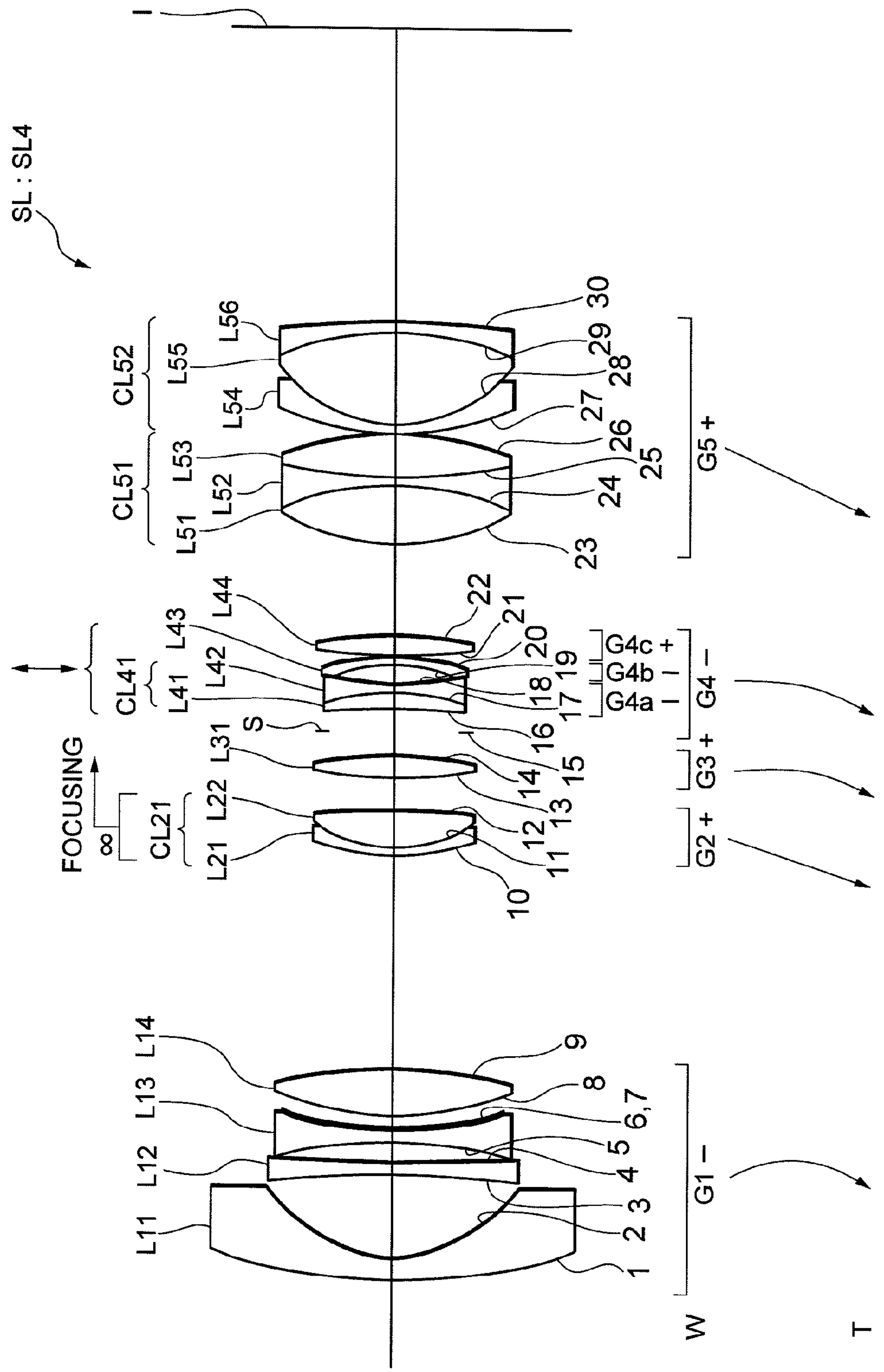
FIG. 14 is a sectional view showing a configuration of an imaging lens according to Example 4 in a wide-angle end state and a zoom trajectory of each lens group upon zooming.

FIG. 14 is a sectional view showing a configuration of an imaging lens according to Example 4. The imaging lens SL4 according to Example 4 is a variation type of the imaging lens SL1 according to Example 1 having a four-lens-group configuration and forms a five-lens-group configuration of a negative-positive-positive-negative-positive configuration by dividing the second lens group G2 of the imaging lens SL1 according to Example 1 having positive refractive power into two to make a second lens group and a third lens group. Incidentally, as for an imaging lens having a five-lens-group configuration, it is possible that the first lens group G1 in the imaging lens SL1 according to Example 1 is divided into two to make a first lens group G1 and a second lens group G2, thereby forming a five-lens-group configuration of a negative-negative-positive-negative-positive configuration.

The imaging lens SL4 according to Example 4 has a five-lens-group configuration, and is composed of, in order from an object side, a front lens group, which is a first lens group G1 having negative refractive power, and a rear lens group composed of a second lens group G2 having positive refractive power, a third lens group G3 having positive refractive power, a fourth lens group G4 having negative refractive power, and a fifth lens group G5 having positive refractive power.

In Example 4, upon zooming from a wide-angle end state (W) to a telephoto end state (T), each distance between lens groups varies such that a distance between the first lens group G1 and the second lens group G2 decreases, a distance between the second lens group G2 and the third lens group G3 varies, a distance between the third lens group G3 and the fourth lens group G4 increases, and a distance between the fourth lens group G4 and the fifth lens group G5 decreases. An aperture stop S is disposed between the third lens group G3 and the fourth lens group G4, and is moved in a body with the fourth lens group G4 upon zooming.

The first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed by a resin layer on the image plane I side lens surface, and a double convex positive lens L14.

Moreover, an antireflection coating explained later is formed on the image plane I side lens surface (surface number 2) of the negative meniscus lens L11 and the object side lens surface (surface number 5) of the double concave negative lens L13 in the first lens group G1.

The second lens group G2 is composed of, in order from the object side, a cemented lens CL21 constructed by a negative meniscus lens L21 having a convex surface facing the object side cemented with a double convex positive lens L22.

In Example 4, with moving the cemented lens CL21 in the second lens group G2 along the optical axis from the object side to the image plane I side, focusing from an infinitely distant object to a close object can be carried out. In this manner, with applying an internal focusing system to the imaging lens, it becomes possible to reduce a load on a focusing motor upon auto focusing, so that quick driving and electric power saving can be achieved.

The third lens group G3 is composed of a double convex positive lens L31.

The fourth lens group G4, which is the sub-lens group, is composed of, in order from the object side, a first negative lens component G4_a_, a second negative lens component G4_b_, and a positive lens component G4_c_.

The first negative lens component G4_a_ is composed of a cemented lens CL41 constructed by, in order from the object side, a positive meniscus lens L41 having a concave surface facing the object side cemented with a double concave negative lens L42. The second negative lens component G4_b_ is composed of a negative meniscus lens L43 having a concave surface facing the first negative lens component G4_a_ side. The positive lens component G4_c_ is composed of a double convex positive lens L44.

In the imaging lens SL4 according to Example 4, with shifting the whole of the fourth lens group G4 in a direction including a component substantially perpendicular to the optical axis, an image shifting on the image plane I is carried out. Accordingly, the imaging lens SL4 according to Example 4 makes it possible to make a correction of an image blur (vibration reduction) that is a correction of variation in an image position on the image plane I caused by vibrations of an optical apparatus including the imaging lens SL4, which is also called as a camera shake. Incidentally, the aperture stop S is preferably not moved in a direction substantially perpendicular to the optical axis upon vibration reduction.

The second negative lens component G4_b_ side lens surface of the first negative lens component G4_a_ is a concave surface facing the second negative lens component G4_b_ side. The second negative lens component G4_b_ has a negative meniscus shape having a concave surface facing the first negative lens component G4_a_ side. In this manner, the shape of an air lens formed by the first negative lens component G4_a_ and the second negative lens component G4_b_ is a double convex shape. With this configuration, decentering coma and inclination of the image plane generated upon shifting the vibration reduction lens group G4 in a direction including a component substantially perpendicular to the optical axis can be excellently corrected.

Moreover, in Example 4, the first negative lens component G4*a* is the cemented lens CL41 whose cemented surface is a concave surface facing the aperture stop S side. With this configuration, it becomes possible to correct chromatic difference in curvature of field, in particular, chromatic difference in curvature of field in the telephoto state. Moreover, in the fourth lens group G4, which is the vibration reduction lens group, with disposing the positive lens component G4*c* having positive refractive power to the fifth lens group G5 side of the fourth lens group G4, it becomes possible to prevent the diameter of the fifth lens group G5 from getting larger, which is a common problem in a super wide-angle zoom lens, without deteriorating vibration reduction performance.

The fifth lens group G5 is composed of, in order from the object side, a triple-cemented lens CL51 constructed by a double convex positive lens L51 cemented with a double concave negative lens L52 cemented with a double convex positive lens L53, and a triple-cemented lens CL52 constructed by a negative meniscus lens L54 having a convex surface facing the object side cemented with a double convex positive lens L55 cemented with a negative meniscus lens L56 having a concave surface facing the object side and an aspherical surface formed on the image side lens surface.

Various values associated with the imaging lens SL4 according to Example 4 are listed in Table 4.

In Example 4, values of aspherical coefficients A3, A5, A7, A9 and A11 are 0, respectively.

TABLE 4

(Specifications)

| | W | M | T |
|---|---|---|---|
| f = | 16.48 | 24.00 | 33.95 |
| FNO = | 4.1 | 4.1 | 4.1 |
| 2ω = | 108° | 84° | 63° |
| Y = | 21.64 | 21.64 | 21.64 |
| TL = | 168.08 | 160.27 | 163.75 |

(Lens Surface Data)

| i | r | d | nd | νd |
|---|---|---|---|---|
| OS | ∞ | ∞ | | |
| *1 | 62.094 | 3.00 | 1.76684 | 46.82 |
| *2 | 14.301 | 11.26 | | |
| 3 | −133.420 | 1.55 | 1.88300 | 40.76 |
| 4 | 227.977 | 2.78 | | |
| 5 | −61.001 | 1.50 | 1.88300 | 40.76 |
| 6 | 52.858 | 0.44 | 1.55389 | 38.09 |
| *7 | 96.032 | 1.50 | | |
| 8 | 41.480 | 6.14 | 1.69895 | 30.13 |
| 9 | −69.496 | (d9) | | |
| 10 | 35.662 | 1.05 | 1.84666 | 23.78 |
| 11 | 19.096 | 4.93 | 1.60342 | 38.01 |
| 12 | −115.677 | (d12) | | |
| 13 | 65.732 | 2.83 | 1.51823 | 58.93 |
| 14 | −65.732 | (d14) | | |
| 15 | ∞ | 3.22 | Aperture Stop S | |
| 16 | −144.424 | 2.12 | 1.70154 | 41.17 |
| 17 | −30.767 | 1.00 | 1.88300 | 40.76 |
| 18 | 36.062 | 2.71 | | |
| 19 | −24.016 | 0.80 | 1.88300 | 40.76 |
| 20 | −40.243 | 0.40 | | |
| 21 | 81.135 | 2.62 | 1.84666 | 23.78 |
| 22 | −57.748 | (d22) | | |
| 23 | 31.111 | 7.93 | 1.49782 | 82.51 |
| 24 | −39.591 | 1.10 | 1.83400 | 37.16 |
| 25 | 78.618 | 5.98 | 1.49782 | 82.51 |
| 26 | −44.322 | 0.15 | | |
| 27 | 39.175 | 1.10 | 1.88300 | 40.76 |
| 28 | 20.218 | 12.25 | 1.48749 | 70.40 |
| 29 | −45.139 | 1.60 | 1.80610 | 40.77 |
| *30 | −76.729 | (Bf) | | |
| I | ∞ | | | |

TABLE 4-continued (Lens Group Data)

| Group | S | Focal Length |
|---|---|---|
| G1 | 1 | −21.43 |
| G2 | 10 | 61.95 |
| G3 | 13 | 63.89 |
| G4 | 16 | −46.90 |
| G5 | 23 | 50.49 |

(Aspherical Surface Data)

Surface Number: 1

κ = 1.000
A4 = −1.020E−05
A6 = 1.549E−08
A8 = −2.904E−12
A10 = −5.504E−15
A12 = 3.829E−18

Surface Number: 2

κ = 0.013
A4 = −6.833E−06
A6 = −4.836E−08
A8 = 1.534E−10
A10 = 0.000E+00
A12 = 0.000E+00

Surface Number: 7

κ = 5.374
A4 = 1.866E−05
A6 = 1.958E−08
A8 = −4.067E−11
A10 = 0.000E+00
A12 = 0.000E+00

Surface Number: 30

κ = 13.944
A4 = 1.097E−05
A6 = 1.562E−08
A8 = −4.875E−11
A10 = 1.846E−13
A12 = −3.267E−17

(Variable Distances)

| | W | M | T |
|---|---|---|---|
| f = | 16.48 | 24.00 | 33.95 |
| d9 = | 29.38 | 12.29 | 2.10 |
| d12 = | 4.49 | 6.04 | 4.72 |
| d14 = | 3.17 | 6.27 | 8.65 |
| d22 = | 12.50 | 5.44 | 1.25 |
| Bf = | 38.57 | 50.25 | 67.06 |

(Values for Conditional Expressions)

Fg3 = −46.898
Fg3c = 40.194
(1) r1 = 36.062 r2 = −24.016
(2) Fa = 0.33
(3) Fb = 0.86

Figure 15A:
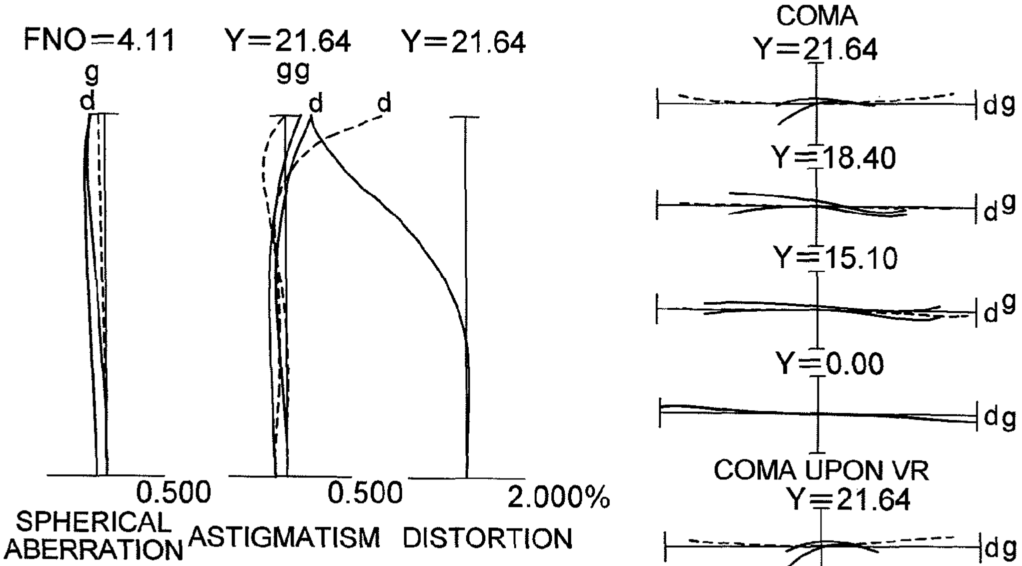
Figure 15B:
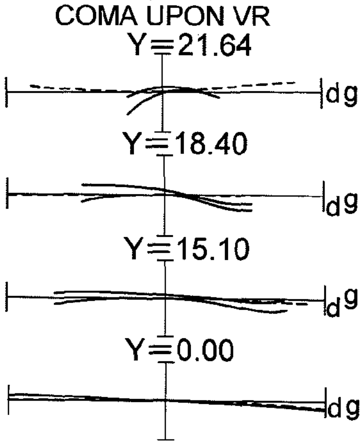
Figures 17A, 17B:
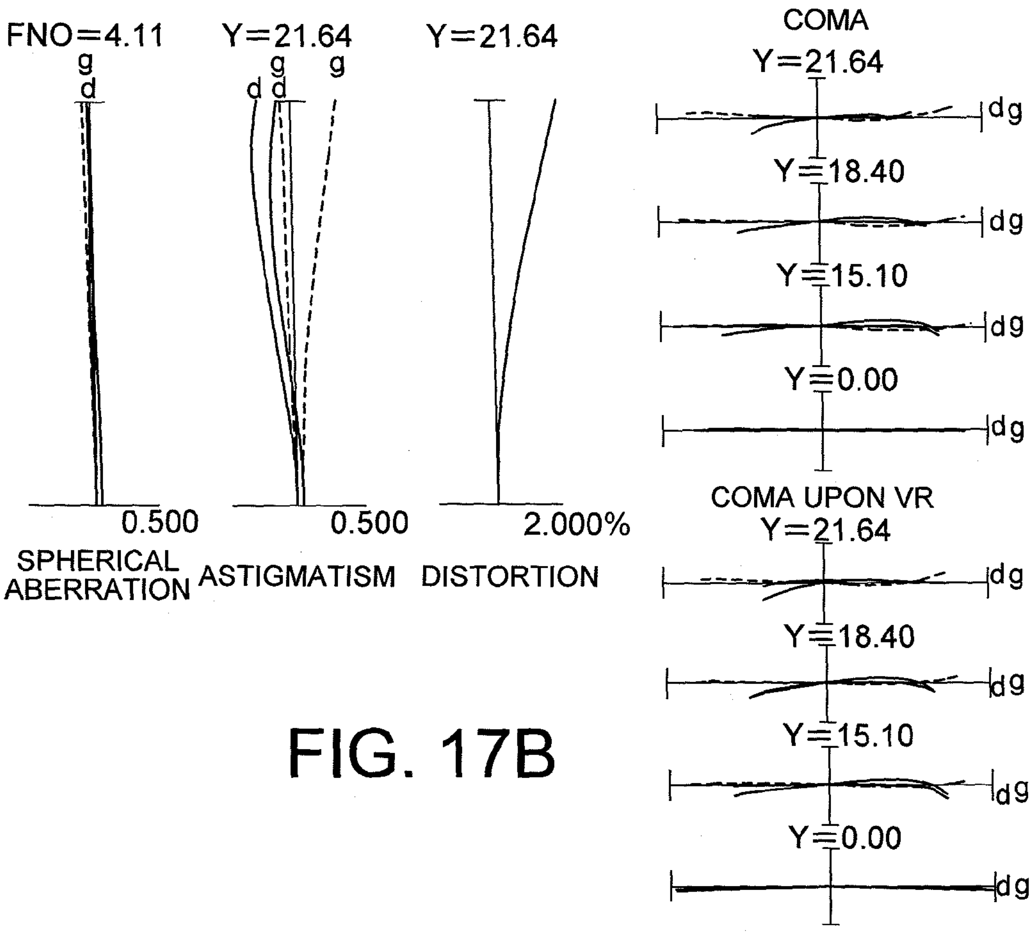

FIGS. 15A and 15B to FIGS. 17A and 17B are graphs of various aberrations of the imaging lens SL4 according to Example 4 upon focusing on infinity. FIGS. 15A and 15B show various aberrations in a wide-angle end state upon focusing on infinity, in which FIG. 15A shows various aberrations without vibration reduction, and FIG. 15B shows coma upon vibration reduction. FIGS. 16A and 16B show various aberrations in an intermediate focal length state upon focusing on infinity, in which FIG. 16A shows various aberrations without vibration reduction, and FIG. 16B shows coma upon vibration reduction. FIGS. 17A and 17B show various aberrations in a telephoto end state upon focusing on infinity, in which FIG. 17A shows various aberrations without vibration reduction, and FIG. 17B shows coma upon vibration reduction. Here, coma upon VR shows value of coma upon carrying out vibration reduction with shifting the whole of the fourth lens group G4 in a direction substantially perpendicular to the optical axis by an amount of 0.2 mm.

As is apparent from the respective graphs shown in FIGS. 15A and 15B to FIGS. 17A and 17B, the imaging lens SL4 according to Example 4 shows superb optical performance as a result of good corrections to various aberrations in each focal length state from the wide-angle end state through the telephoto end state, even upon shifting the vibration reduction lens group.

In the imaging lens SL4 according to Example 4, with applying an antireflection coating explained later to the image plane I side lens surface (concave surface facing the image plane I side) of the negative meniscus lens L11 of the first lens group G1 and the object side lens surface (concave surface facing the object) of the double concave negative lens L13 in the first lens group G1, it becomes possible to reduce ghost images and flare.

In this manner, the imaging lens SL4 according to Example 4 makes it possible to realize a super wide-angle, high zoom ratio zoom lens capable of zooming from a super-wide angle of view of 100 degrees or more to a standard angle of view of about 50 degrees, having excellent optical performance with excellently correcting various aberrations upon vibration reduction and suppressing ghost images and flare.

Example 5

Figure 18:
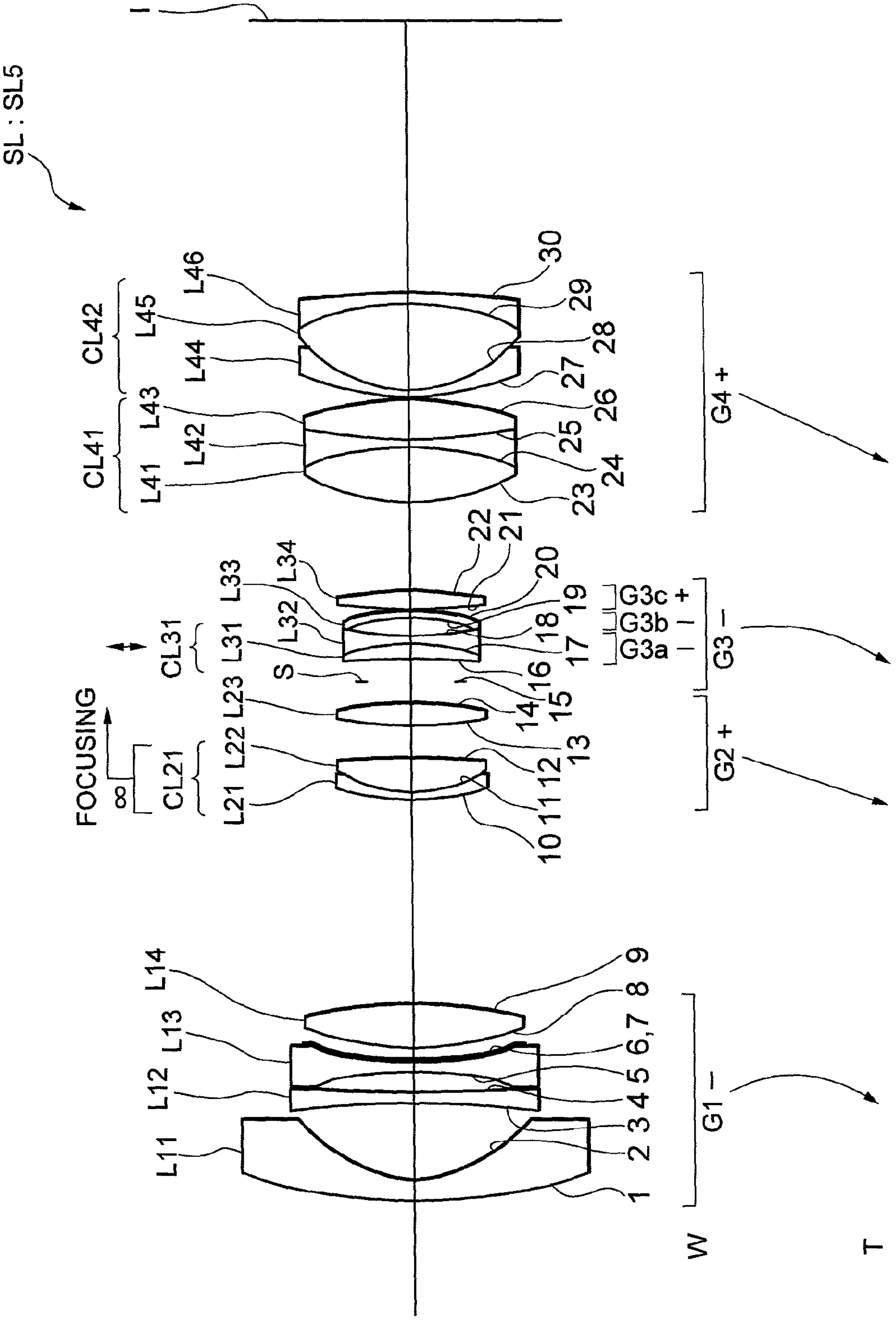
FIG. 18 is a sectional view showing a configuration of an imaging lens according to Example 5 in a wide-angle end state and a zoom trajectory of each lens group upon zooming.

FIG. 18 is a sectional view showing a configuration of an imaging lens according to Example 5. The imaging lens SL5 according to Example 5 has a four-lens-group configuration, and is composed of, in order from an object side, a front lens group, which is a first lens group G1 having negative refractive power, and a rear lens group composed of a second lens group G2 having positive refractive power, a third lens group G3 having negative refractive power, and a fourth lens group G4 having positive refractive power.

In Example 5, upon zooming from a wide-angle end state (W) to a telephoto end state (T), each distance between lens groups varies such that a distance between the first lens group G1 and the second lens group G2 decreases, a distance between the second lens group G2 and the third lens group G3 increases, and a distance between the third lens group G3 and the fourth lens group G4 decreases. An aperture stop S is disposed between the second lens group G2 and the third lens group G3, and is moved in a body with the third lens group G3 upon zooming.

The first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed by a resin layer on the image plane I side lens surface, and a double convex positive lens L14.

Moreover, an antireflection coating explained later is formed on the object side lens surface (surface number 8) of the double convex positive lens L14 in the first lens group G1.

The second lens group G2 is composed of, in order from the object side, a cemented lens CL21 constructed by a negative meniscus lens L21 having a convex surface facing the object side cemented with a double convex positive lens L22, and a double convex positive lens L23.

In Example 5, with moving the cemented lens CL21 in the second lens group along the optical axis from the object side to the image plane I side, focusing from an infinitely distant object to a close object can be carried out. In this manner, with applying an internal focusing system to the imaging lens, it becomes possible to reduce a load on a focusing motor upon auto focusing, so that quick driving and electric power saving can be achieved.

The third lens group G3, which is a sub-lens group, is composed of, in order from the object side, a first negative lens component G3*a*, a second negative lens component G3*b*, and a positive lens component G3*c*.

The first negative lens component G3*a* is composed of a cemented lens CL31 constructed by, in order from the object side, a positive meniscus lens L31 having a concave surface facing the object side cemented with a double concave negative lens L32. The second negative lens component G3*b* is composed of a negative meniscus lens L33 having a concave surface facing the first negative lens component G3*a* side. The positive lens component G3*c* is composed of a double convex positive lens L34.

In Example 5, with shifting the first negative lens component G3*a* in a direction including a component substantially perpendicular to the optical axis, an image shifting on the image plane I is carried out. Accordingly, the imaging lens SL5 according to Example 5 makes it possible to make a correction of an image blur (vibration reduction) that is a correction of variation in an image position on the image plane I caused by vibrations of an optical apparatus including the imaging lens SL5, which is also called as a camera shake. Incidentally, the aperture stop S is preferably not moved in a direction substantially perpendicular to the optical axis upon vibration reduction.

The second negative lens component G3*b* side lens surface of the first negative lens component G3*a* is a concave surface facing the second negative lens component G3*b* side. The second negative lens component G3*b* has a negative meniscus shape having a concave surface facing the first negative lens component G3*a* side. In this manner, the shape of an air lens formed by the first negative lens component G3*a* and the second negative lens component G3*b* is a double convex shape. With this configuration, decentering coma and inclination of the image plane generated upon shifting the vibration reduction lens group G3*a* in a direction including a component substantially perpendicular to the optical axis can be excellently corrected.

Moreover, in Example 5, the first negative lens component G3*a* is the cemented lens CL31 whose cemented surface is a concave surface facing the aperture stop S side. With this configuration, it becomes possible to correct chromatic difference in curvature of field, in particular, chromatic difference in curvature of field in the telephoto state.

Moreover, in Example 5, with disposing the positive lens component G3*c* having positive refractive power to the fourth lens group G4 side of the third lens group G3, it becomes possible to prevent the diameter of the fourth lens group G4 from getting larger, which is a common problem in a super wide-angle zoom lens, without deteriorating vibration reduction performance.

The fourth lens group G4 is composed of, in order from the object side, a triple-cemented lens CL41 constructed by a double convex positive lens L41 cemented with a double concave negative lens L42 cemented with a double convex positive lens L43, and a triple-cemented lens CL42 constructed by a negative meniscus lens L44 having a convex surface facing the object side cemented with a double convex positive lens L45 cemented with a negative meniscus lens L46 having a concave surface facing the object side and an aspherical surface formed on the image side lens surface.

Various values associated with the imaging lens SL5 according to Example 5 are listed in Table 5.

In Example 5, values of aspherical coefficients A3, A5, A7, A9 and A11 are 0, respectively.

TABLE 5

(Specifications)

| | W | M | T |
|---|---|---|---|
| f = | 16.48 | 24.00 | 33.94 |
| FNO = | 4.1 | 4.1 | 4.1 |
| 2ω = | 108° | 84° | 63° |
| Y = | 21.64 | 21.64 | 21.64 |
| TL = | 169.18 | 160.72 | 165.24 |

(Lens Surface Data)

| i | r | d | nd | νd |
|---|---|---|---|---|
| OS | ∞ | ∞ | | |
| *1 | 64.361 | 3.00 | 1.76690 | 46.85 |
| *2 | 14.627 | 11.25 | | |
| 3 | −118.914 | 1.55 | 1.88300 | 40.76 |
| 4 | 261.338 | 2.85 | | |
| 5 | −57.268 | 1.50 | 1.88300 | 40.76 |
| 6 | 52.742 | 0.40 | 1.55389 | 38.09 |
| *7 | 96.287 | 1.50 | | |
| 8 | 42.407 | 6.40 | 1.69895 | 30.13 |
| 9 | −65.202 | (d9) | | |
| 10 | 36.176 | 1.05 | 1.84666 | 23.78 |
| 11 | 19.297 | 4.95 | 1.60342 | 38.01 |
| 12 | −121.274 | 4.70 | | |
| 13 | 65.310 | 3.10 | 1.51823 | 58.93 |
| 14 | −65.310 | (d14) | | |
| 15 | ∞ | 3.26 | Aperture Stop S | |
| 16 | −137.621 | 2.10 | 1.70154 | 41.17 |
| 17 | −31.799 | 1.00 | 1.88300 | 40.76 |
| 18 | 35.395 | 2.90 | | |
| 19 | −24.463 | 0.80 | 1.88300 | 40.76 |
| 20 | −40.108 | 0.15 | | |
| 21 | 75.282 | 2.70 | 1.84666 | 23.78 |
| 22 | −61.234 | (d22) | | |
| 23 | 29.863 | 8.00 | 1.49782 | 82.51 |
| 24 | −43.301 | 1.10 | 1.83400 | 37.16 |
| 25 | 75.908 | 5.95 | 1.49782 | 82.51 |
| 26 | −47.092 | 0.15 | | |
| 27 | 39.817 | 1.10 | 1.88300 | 40.76 |
| 28 | 20.500 | 12.15 | 1.48749 | 70.41 |
| 29 | −40.025 | 1.60 | 1.80610 | 40.77 |
| *30 | −72.448 | (Bf) | | |
| I | ∞ | | | |

(Lens Group Data)

| Group | S | Focal Length |
|---|---|---|
| G1 | 1 | −21.30 |
| G2 | 10 | 34.14 |
| G3 | 16 | −46.90 |
| G4 | 23 | 50.02 |

(Aspherical Surface Data)

Surface Number: 1

κ = 1.000
A4 = −8.262E−06
A6 = 1.472E−08
A8 = −1.057E−11
A10 = 7.575E−15
A12 = −2.361E−18

Surface Number: 2

κ = 0.017
A4 = −6.389E−06
A6 = −3.010E−08

TABLE 5-continued

A8 = 8.699E−11
A10 = 0.000E+00
A12 = 0.000E+00

Surface Number: 7

κ = 8.352
A4 = 1.862E−05
A6 = 1.672E−08
A8 = −3.678E−11
A10 = 0.000E+00
A12 = 0.000E+00

Surface Number: 30

κ = 12.401
A4 = 1.208E−05
A6 = 1.539E−08
A8 = −2.918E−11
A10 = 1.594E−13
A12 = 4.038E−18

(Variable Distances)

| | W | M | T |
|---|---|---|---|
| f = | 16.48 | 23.99 | 33.94 |
| d9 = | 28.97 | 11.94 | 2.09 |
| d14 = | 3.26 | 6.00 | 8.50 |
| d22 = | 12.46 | 5.96 | 1.21 |
| Bf = | 38.60 | 50.93 | 67.55 |

(Values for Conditional Expressions)

Fg3 = −46.902
Fg3c = 40.248
(1) r1 = 35.395 r2 = −24.463
(2) Fa = 0.31
(3) Fb = 0.86

Figure 19A:
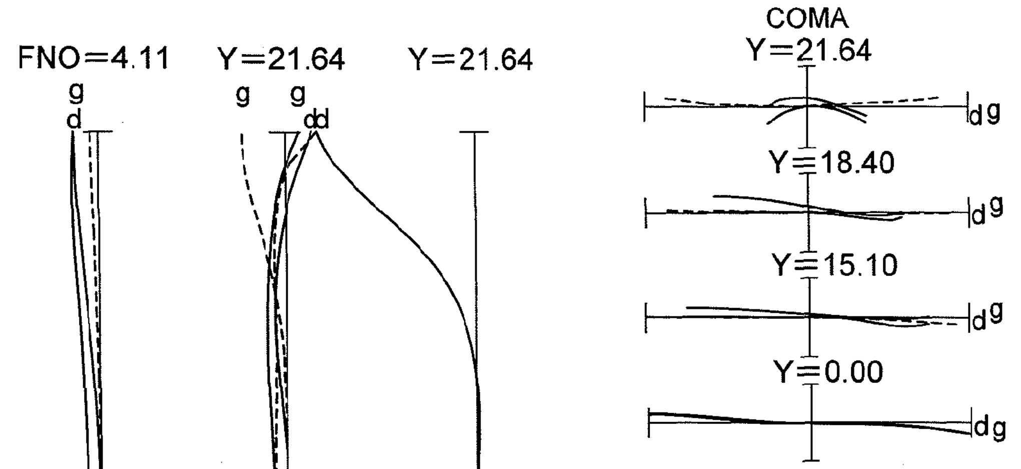
Figure 19B:
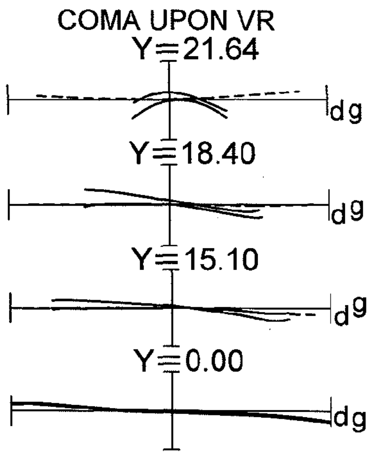

FIGS. 19A and 19B to FIGS. 21A and 21B are graphs of various aberrations of the imaging lens SL5 according to Example 5 upon focusing on infinity. FIGS. 19A and 19B show various aberrations in a wide-angle end state upon focusing on infinity, in which FIG. 19A shows various aberrations without vibration reduction, and FIG. 19B shows coma upon vibration reduction. FIGS. 20A and 20B show various aberrations in an intermediate focal length state upon focusing on infinity, in which FIG. 20A shows various aberrations without vibration reduction, and FIG. 20B shows coma upon vibration reduction. FIGS. 21A and 21B show various aberrations in a telephoto end state upon focusing on infinity, in which FIG. 21A shows various aberrations without vibration reduction, and FIG. 21B shows coma upon vibration reduction. Here, coma upon VR shows value of coma upon carrying out vibration reduction with shifting the first negative lens component G3*a* in a direction substantially perpendicular to the optical axis by an amount of 0.2 mm.

As is apparent from the respective graphs shown in FIGS. 19A and 19B to FIGS. 21A and 21B, the imaging lens SL5 according to Example 5 shows superb optical performance as a result of good corrections to various aberrations in each focal length state from the wide-angle end state through the telephoto end state, even upon shifting the vibration reduction lens group.

In the imaging lens SL5 according to Example 5, with applying an antireflection coating explained later to the object side lens surface (convex surface facing the object) of the double convex positive lens L14 in the first lens group G1, it becomes possible to reduce ghost images and flare.

In this manner, the imaging lens SL5 according to Example 5 makes it possible to realize a super wide-angle, high zoom ratio zoom lens capable of zooming from a super-wide angle of view of 100 degrees or more to a standard angle of view of about 50 degrees, having excellent optical performance with excellently correcting various aberrations upon vibration reduction and suppressing ghost images and flare.

Figure 24:
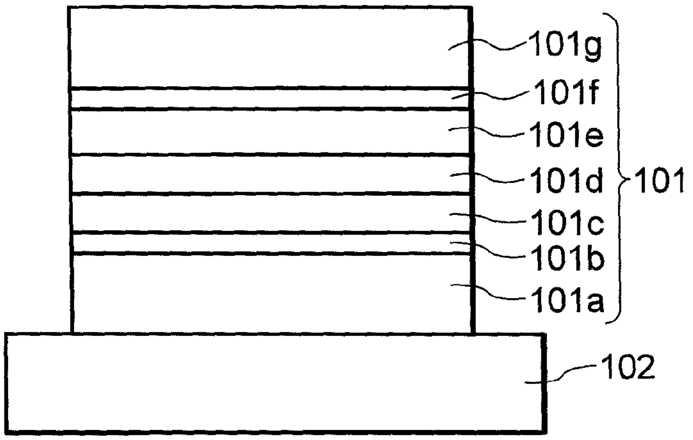
FIG. 24 is an explanatory diagram showing one example of a layer structure of an antireflection coating.

Then, the antireflection coating (which is also referred to as a multi-layered broadband antireflection coating) used for the imaging lens according to the present application will be described. FIG. 24 is a view showing one example of a film structure of the antireflection coating. This antireflection coating 101 is a 7-layered film formed on an optical surface of an optical member 102 such as a lens. A first layer 101*a* is composed of aluminum oxide that is vapor-deposited by a vacuum evaporation method. A second layer 101*b* composed of a mixture of titanium oxide and zirconium oxide that are vapor-deposited by the vacuum evaporation method, is further formed on the first layer 101*a*. Moreover, a third layer 101*c* composed of the aluminum oxide that is vapor-deposited by the vacuum evaporation method is formed on the second layer 101*b*, and a fourth layer 101*d* composed of the mixture of titanium oxide and zirconium oxide that are vapor-deposited by the vacuum evaporation method, is further formed on the third layer 101*c*. Moreover, a fifth layer 101*e* composed of aluminum oxide that is vapor-deposited by the vacuum evaporation method is formed on the fourth layer 101*d*, and a sixth layer 101*f* composed of the mixture of titanium oxide and zirconium oxide that are vapor-deposited by the vacuum evaporation method, is further formed on the fifth layer 101*e*.

Then, a seventh layer 101*g* composed of a mixture of magnesium fluoride and silica is formed by a wet process on the thus-formed sixth layer 101*f*, thus forming the antireflection coating 101 according to the present embodiment. The formation of the seventh layer 101*g* involves using a sol-gel process classified as one type of the wet process. The sol-gel process is a method for forming a film such that an optical-thin-film-material sol is applied to an optical surface of an optical member, after accumulating the gel film it is dipped into a liquid, and the liquid is vaporized and dried with controlling temperature and pressure of the liquid over the critical state to form the film. Incidentally, the wet process may involve using, without being limited to the sol-gel process, a process of acquiring a solid-state film through none of the gel state.

In this manner, the first layer 101*a* through the sixth layer 101*f* of the antireflection coating 101 are formed by electron beam evaporation defined as a dry process, and the uppermost seventh layer 101*g* is formed in the following procedures by the wet process using a sol liquid prepared by a hydrogen fluoride/magnesium acetate process. At first, an aluminum oxide layer serving as the first layer 101*a*, a titanium oxide-zirconium oxide mixture layer serving as the second layer 101*b*, an aluminum oxide layer serving as the third layer 101*c*, a titanium oxide-zirconium oxide mixture layer serving as the fourth layer 101*d*, an aluminum oxide layer serving as the fifth layer 101*e* and a titanium oxide-zirconium oxide mixture layer serving as the sixth layer 101*f*, are formed beforehand in this sequence on an antireflection-coating-forming surface of a lens (the optical surface of the optical member 102 described above) by using a vacuum evaporation apparatus. Then, after taking the optical member 102 out of the evaporation apparatus, the layer composed of the mixture of magnesium fluoride and silica is formed as the seventh layer 101*g* by coating sol liquid prepared by the hydrogen fluoride/magnesium acetate process in a way that uses a spin coating method. The formula (4) given below is a reaction formula on the occasion of being prepared by the hydrogen fluoride/magnesium acetate process:

$$2HF+Mg(CH3COO)2 \rightarrow MgF2+2CH3COOH \quad (4).$$

The sol liquid used for forming the seventh layer, after mixing the materials and after conducting a high-temperature pressurization maturing process at 140° C. for 24 hours in an autoclave, is used for forming the film. The optical member 102, after finishing the film growth of the seventh layer 101*g*, undergoes a heating process at 160° C. for one hour in the atmospheric air and is thus completed. With using such a sol gel method, atoms or molecules are built up from several to several tens to become particles of several nanometers to several tens of nanometers, and several these particles are built up to form secondary particles. As a result, the secondary particles are piled up to form the seventh layer 101*g*.

Optical performance of the optical member including the thus-formed antireflection coating 101 will hereinafter be described by using spectral characteristics shown in FIG. 25.

The optical member (lens) including the antireflection coating according to the present embodiment is formed under the conditions shown in the following Table 6. Herein, the Table 6 shows respective optical film thicknesses of the layers 101*a* (the first layer) through 101*g* (the seventh layer) of the antireflection coating 101, which are obtained under such conditions that A denotes a reference wavelength and the refractive index of the substrate (optical member) is set to 1.62, 1.74 and 1.85. Note that the Table 6 shows Al203 expressed as aluminum oxide, ZrO2+TiO2 expressed as mixture of titanium oxide and zirconium oxide and SiO2+MgF2 expressed as mixture of magnesium fluoride and silica.

TABLE 6

| layer | material | n | thicknesses of layers | | |
|---|---|---|---|---|---|
| | medium air | 1 | | | |
| 7 | SiO2 + MgF2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 25:
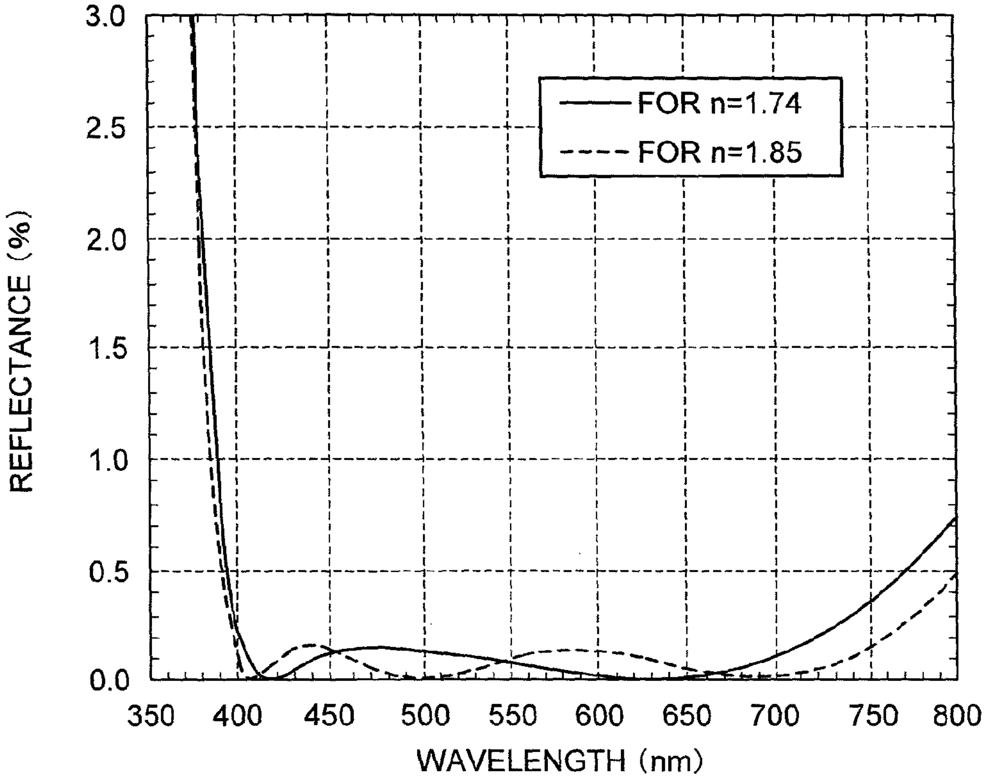
FIG. 25 is a graph showing spectral characteristics of the antireflection coating.

FIG. 25 shows the spectral characteristics when the light beams are vertically incident on the optical member in which the optical film thickness of each of the layers of the antireflection coating 101 is designed, with the reference wavelength λ set to 550 nm in the Table 6.

It is understood from FIG. 25 that the optical member including the antireflection coating 101 designed with the reference wavelength λ set to 550 nm can restrain the reflectance down to 0.2% or less over the entire range in which the wavelengths of the light beams are 420 nm through 720 nm. Although the spectral characteristics of the optical member including an antireflection coating whose refractive index of the substrate listed in Table 6 is 1.62 is not shown in FIG. 25, it is needless to say that the optical member has substantially the same spectral characteristics such as the substrate refractive index is 1.74 or 1.85. Further, in Table 6, even the optical member including the antireflection coating 101, in which each optical film thickness is designed with the reference wavelength λ set to d-line (wavelength 587.6 nm), has substantially the same spectral characteristics as in the case where the reference wavelength λ shown in FIG. 25 is 550 nm in a way that affects substantially none of the spectral characteristics thereof.

Then, a modified example of the antireflection coating will be explained. The antireflection coating is a 5-layered film, and, similarly to the Table 6, the optical film thickness of each layer with respect to the reference wavelength λ is designed under conditions shown in the following Table 7. In this modified example, the formation of the fifth layer involves using the sol-gel process described above.

Figure 26:
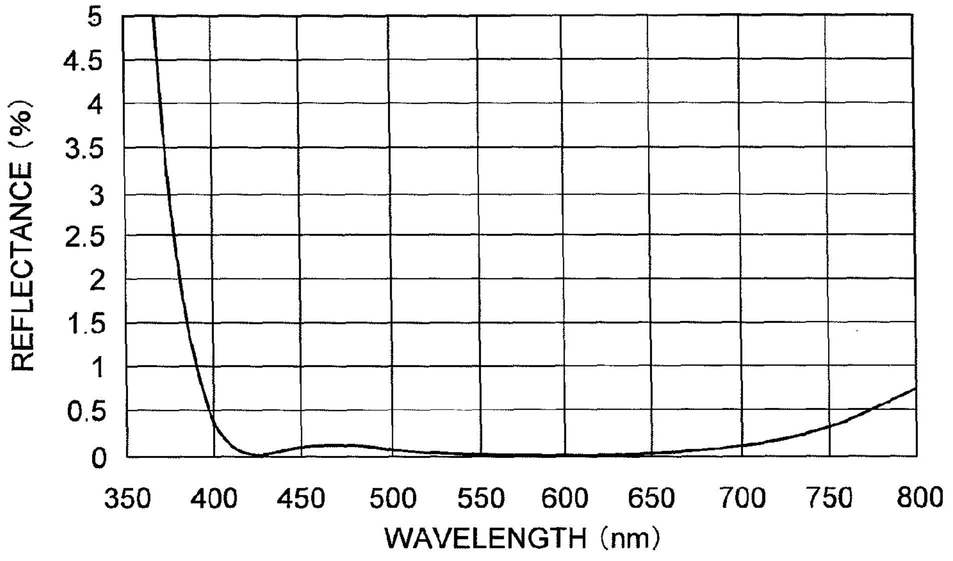
FIG. 26 is a graph showing spectral characteristics of an antireflection coating according to a modified example.

FIG. 26 shows the spectral characteristics when the light beams are incident vertically on the optical member in which the optical film thickness of each of the layers is designed, with the substrate refractive index set to 1.52 and the reference wavelength λ set to 550 nm in Table 7. It is understood from FIG. 26 that the antireflection coating in the modified example can suppress reflectance down to 0.2% or less over the entire range in which the wavelengths of the light beams are 420 nm-720 nm. Note that in Table 7, even the optical member including the antireflection coating, in which each optical film thickness is designed with the reference wavelength λ set to the d-line (wavelength 587.6 nm), has substantially the same spectral characteristics as the spectral characteristics shown in FIG. 26 in a way that affects substantially none of the spectral characteristics thereof.

TABLE 7

| layer | material | n | thicknesses of layers | |
|---|---|---|---|---|
| | medium air | 1 | | |
| 5 | SiO2 + MgF2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 27:
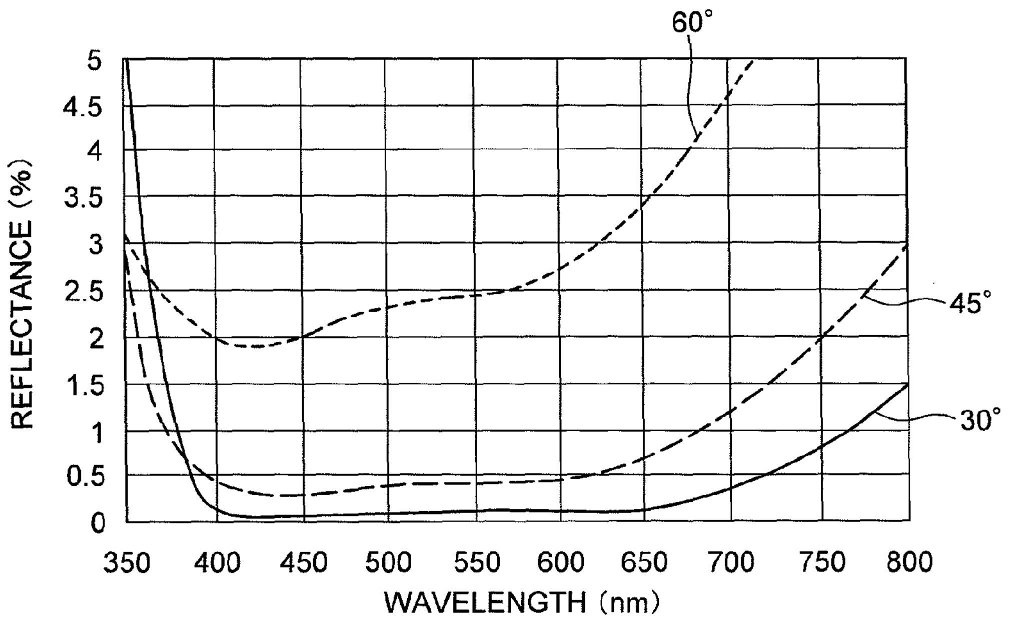
FIG. 27 is a graph showing incident angle dependency of spectral characteristics of the antireflection coating according to the modified example.

FIG. 27 shows the spectral characteristics in such a case that the incident angles of the light beams on the optical member having the spectral characteristics shown in FIG. 26 are 30 degrees, 45 degrees and 60 degrees, respectively. Note that FIGS. 26 and 27 do not illustrate the spectral characteristics of the optical member including the antireflection coating in which the refractive index of the substrate is 1.46, however, it is understood that the optical member has substantially the same spectral characteristics such as the refractive index of the substrate being 1.52.

Figure 28:
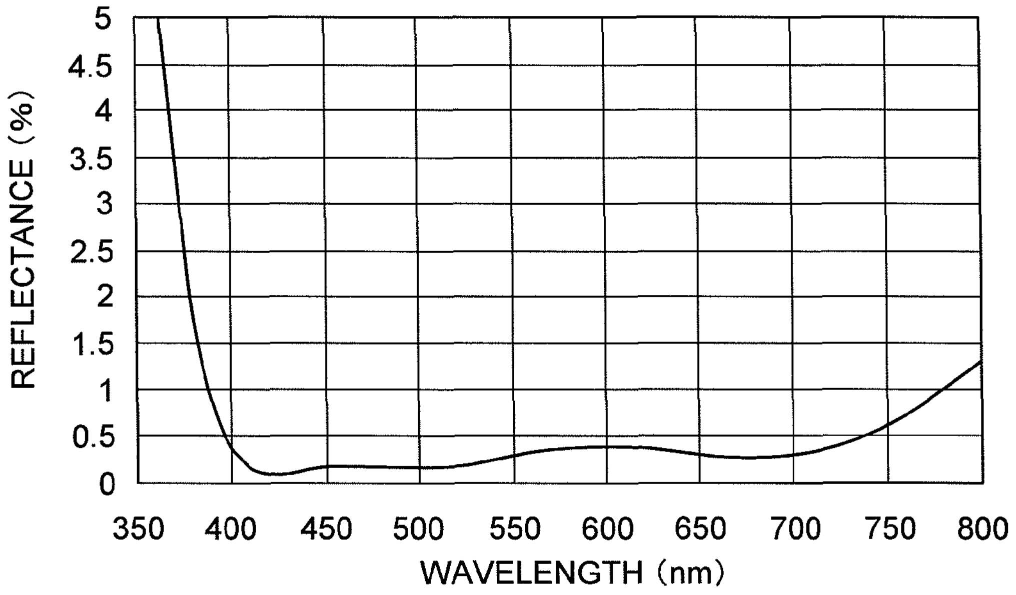
FIG. 28 is a graph showing spectral characteristics of an antireflection coating manufactured by a prior art.

Furthermore, FIG. 28 shows one example of the antireflection coating formed by only the dry process such as a conventional vacuum evaporation method by way of comparison. FIG. 28 shows the spectral characteristics when the light beams are incident vertically on the optical member in which the antireflection coating structured under the conditions shown in the following Table 8 is designed with the refractive index of the substrate set to 1.52 in the same way as in Table 7. Moreover, FIG. 29 shows the spectral characteristics in such a case that the incident angles of the light beams on the optical member having the spectral characteristics shown in FIG. 28 are 30 degrees, 45 degrees and 60 degrees, respectively.

TABLE 8

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| | refractive index of substrate | | 1.52 |

Figure 29:
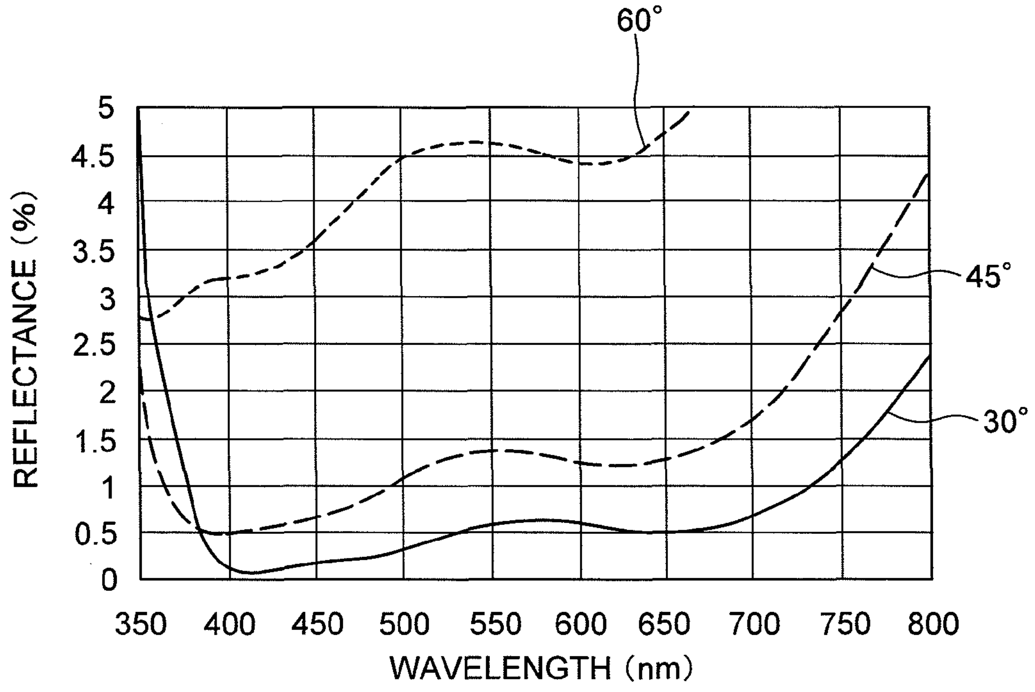
FIG. 29 is a graph showing incident angle dependency of spectral characteristics of the antireflection coating manufactured by the prior art.

To compare the spectral characteristics of the optical member including the antireflection coating according to the present embodiment illustrated in FIGS. 25 through 27 with the spectral characteristics in the conventional examples shown in FIGS. 28 and 29, it is well understood that the present antireflection coating has the much lower reflectance at any incident angles and, besides, has the low reflectance in the broader band.

Then, an example of applying the antireflection coating shown in the Tables 6 and 7 to Examples 1 through 5 discussed above is explained.

In the imaging lens according to Example 1, as shown in Table 1, since the refractive index nd of the negative meniscus lens L11 of the first lens group G1 is 1.76690 (nd=1.76690), and the refractive index nd of the double concave negative lens L12 of the first lens group G1 is 1.88300 (nd=1.88300), it is feasible to reduce the reflected light from each lens surface and to reduce ghost images and flare as well by applying the antireflection coating 101 (see Table 6) corresponding to 1.74 as the refractive index of the substrate to the object side lens surface of the negative meniscus lens L11 and applying the antireflection coating (see Table 6) corresponding to 1.85 as the refractive index of the substrate to the object side lens surface of the double concave negative lens L12.

Moreover, in the imaging lens according to Example 2, as shown in the Table 2, since the refractive index nd of the negative meniscus lens L11 of the first lens group G1 is 1.76684 (nd=1.76684), and the refractive index nd of the double concave negative lens L12 of the first lens group G1 is 1.88187 (nd=1.88187), it is feasible to reduce the reflected light from each lens surface and to reduce ghost images and flare as well by applying the antireflection coating 101 (see Table 6) corresponding to 1.74 as the refractive index of the substrate to the image side lens surface of the negative meniscus lens L11 and applying the antireflection coating (see Table 6) corresponding to 1.85 as the refractive index of the substrate to the object side lens surface of the double concave negative lens L12.

Moreover, in the imaging lens according to Example 3, as shown in the Table 3, since the refractive index nd of the negative meniscus lens L11 of the first lens group G1 is 1.76684 (nd=1.76684), it is feasible to reduce the reflected light from each lens surface and to reduce ghost images and flare as well by applying the antireflection coating (see Table 6) corresponding to 1.74 as the refractive index of the substrate to the image side lens surface of the negative meniscus lens L11.

Moreover, in the imaging lens according to Example 4, as shown in the Table 4, since the refractive index nd of the negative meniscus lens L11 of the first lens group G1 is 1.76684 (nd=1.76684), and the refractive index nd of the double concave negative lens L13 of the first lens group G1 is 1.88300 (nd=1.88300), it is feasible to reduce the reflected light from each lens surface and to reduce ghost images and flare as well by applying the antireflection coating 101 (see Table 6) corresponding to 1.74 as the refractive index of the substrate to the image side lens surface of the negative meniscus lens L11 and applying the antireflection coating 101 (see Table 6) corresponding to 1.85 as the refractive index of the substrate to the object side lens surface of the double concave negative lens L13.

Moreover, in the imaging lens according to Example 5, as shown in the Table 5, since the refractive index nd of the positive lens L14 of the first lens group G1 is 1.69895 (nd=1.69895), it is feasible to reduce the reflected light from each lens surface and to reduce ghost images and flare as well by applying the antireflection coating 101 (see Table 6) corresponding to 1.74 as the refractive index of the substrate to the object side lens surface of the positive lens L14.

Incidentally, the antireflection coating 101 can be applied to a plane optical surface of a plane parallel plate or a curved optical surface of a lens.

As described above, an imaging lens according to each Example of the present embodiment makes it possible to excellently correct various aberrations in each focal length state from the wide-angle end state to the telephoto end state even upon carrying out vibration correction with reducing ghost images and flare. Moreover, the present embodiment makes it possible to provide an imaging lens being a super wide-angle, high zoom ratio zoom lens capable of zooming from a super-wide angle of view of 100 degrees or more to a standard angle of view of about 50 degrees, having excellent optical performance with excellently correcting various aberrations upon carrying out vibration reduction.

What is claimed is:

1. An imaging lens consisting of:

a front lens group having negative refractive power disposed to the most object side; and a rear lens group disposed to an image side of the front lens group, the rear lens group including a sub-lens group having negative refractive power, at least a portion of the sub-lens group moving in a direction including a component substantially perpendicular to an optical axis, the sub-lens group including, in order from the object side, a first negative lens component having negative refractive power, a second negative lens component having negative refractive power, and a positive lens component having positive refractive power, the second negative lens component side lens surface of the first negative lens component being a concave surface facing the second negative lens component side, the second negative lens component having a concave surface facing the first negative lens component side, an antireflection coating being applied on at least one optical surface of the front lens group, and the antireflection coating including at least one layer formed by use of a wet process.

2. The imaging lens according to claim 1, wherein the antireflection coating is a multi-layered film, and the layer formed by the wet process is the uppermost layer of the layers composing the multi-layered film.

3. The imaging lens according to claim 1, wherein a refractive index of the layer formed by use of the wet process is equal to 1.30 or less.

4. The imaging lens according to claim 1, wherein the optical surface on which the antireflection coating is applied is a lens surface having a concave shape.

5. The imaging lens according to claim 4, wherein the lens surface having the concave shape is the image side lens surface.

6. The imaging lens according to claim 4, wherein the lens surface having the concave shape is the object side lens surface.

7. The imaging lens according to claim 1, wherein the optical surface on which the antireflection coating is applied is a lens surface having a convex shape.

8. The imaging lens according to claim 1, wherein the optical surface on which the antireflection coating is applied is a lens surface of the most object side lens.

9. The imaging lens according to claim 1, wherein the optical surface on which the antireflection coating is applied is a lens surface of a second lens counted from the most object side lens.

10. The imaging lens according to claim 1, wherein an aperture stop is disposed in the vicinity of the sub-lens group.

11. The imaging lens according to claim 10, wherein the aperture stop is disposed in the vicinity of the object side of the first negative lens component.

12. The imaging lens according to claim 1, wherein the positive lens component is a double convex positive lens.

13. The imaging lens according to claim 1, wherein at least one of the first negative lens component, the second negative lens component and the positive lens component is a cemented lens.

14. The imaging lens according to claim 13, wherein an aperture stop is disposed in the vicinity of the sub-lens group, and a cemented surface of the cemented lens has a concave shape facing the aperture stop side.

15. The imaging lens according to claim 1, wherein the front lens group consists of a first lens group, the rear lens group includes, in order from the object side, a second lens group having positive refractive power, a third lens group having negative refractive power and a fourth lens group having positive refractive power, the sub-lens group consists of the third lens group, and upon zooming from a wide-angle end state to a telephoto end state, a distance between the first lens group and the second lens group varies, a distance between the second lens group and the third lens group varies, and a distance between the third lens group and the fourth lens group varies.

16. The imaging lens according to claim 15, wherein upon zooming from the wide-angle end state to the telephoto end state, the distance between the first lens group and the second lens group decreases, the distance between the second lens group and the third lens group increases, and the distance between the third lens group and the fourth lens group decreases.

17. The imaging lens according to claim 1, wherein the front lens group consists of a first lens group, the rear lens group includes, in order from the object side, a second lens group having positive refractive power, a third lens group having positive refractive power, a fourth lens group having negative refractive power, and a fifth lens group having positive refractive power, the sub-lens group consists of the fourth lens group, and upon zooming from a wide-angle end state to a telephoto end state, a distance between the first lens group and the second lens group decreases, a distance between the second lens group and the third lens group varies, a distance between the third lens group and the fourth lens group increases, and a distance between the fourth lens group and the fifth lens group decreases.

18. An optical apparatus equipped with the imaging lens according to any one of claims 1 through 17.

19. A method for manufacturing an imaging lens, the method comprising steps of:

disposing, in order from an object side, a front lens group having negative refractive power, and a rear lens group including a sub-lens group having negative refractive power;

applying an antireflection coating to at least one optical surface in the first lens group such that the antireflection coating includes at least one layer formed by a wet process;

disposing the sub-lens group, in order from the object side, a first negative lens component having negative refractive power, a second negative lens component having negative refractive power and a positive lens component having positive refractive power;

disposing an air lens formed between the first negative lens component and the second negative lens component having a double convex shape; and disposing at least a portion of the sub-lens group movably in a direction including a component substantially perpendicular to an optical axis.

* * * * *